US012697694B2

(12) United States Patent
Tanaka et al.

(10) Patent No.: US 12,697,694 B2
(45) Date of Patent: Aug. 4, 2026

(54) WORKPIECE STOCKER

(71) Applicant: DMG MORI CO., LTD., Nara (JP)

(72) Inventors: Shojiro Tanaka, Nara (JP); Shotaro Morikawa, Sapporo (JP); Tomoya Sadano, Nara (JP); Yuki Kumano, Nara (JP)

(73) Assignee: DMG MORI CO., LTD., Nara (JP)

( * ) Notice: Subject to any disclaimer, the term of this patent is extended or adjusted under 35 U.S.C. 154(b) by 125 days.

(21) Appl. No.: 18/367,251

(22) Filed: Sep. 12, 2023

(65) Prior Publication Data

US 2024/0001499 A1 Jan. 4, 2024

Related U.S. Application Data

(63) Continuation-in-part of application No. PCT/JP2021/010125, filed on Mar. 12, 2021.

(51) Int. Cl.
| | |
|---|---|
| *B23Q 7/14* | (2006.01) |
| *B25J 5/02* | (2006.01) |
| *B65G 1/06* | (2006.01) |

(52) U.S. Cl.
CPC . *B23Q 7/14* (2013.01); *B25J 5/02* (2013.01)

(58) Field of Classification Search
None
See application file for complete search history.

(56) References Cited

U.S. PATENT DOCUMENTS

| | | | | |
|---|---|---|---|---|
| 5,125,783 A | * | 6/1992 | Kawasoe | G05B 19/4189 198/349.6 |
| 6,019,563 A | * | 2/2000 | Murata | H10P 72/3214 414/940 |
| 10,696,339 B2 | * | 6/2020 | Thorwarth | B23P 21/004 |

FOREIGN PATENT DOCUMENTS

| | | |
|---|---|---|
| JP | S60242930 A | 12/1985 |
| JP | H0881018 A | 3/1996 |
| JP | 2012161889 A | 8/2012 |
| JP | 2020161113 A | 10/2020 |
| WO | 2018092222 A1 | 5/2018 |

OTHER PUBLICATIONS

International Search Report for related Application No. PCT/JP2021/010125; report dated May 18, 2021.

* cited by examiner

*Primary Examiner* — Kavel Singh

(57) ABSTRACT

A workpiece stocker houses a workpiece setting member such that the workpiece setting member is able to be pulled out from a housed position to a vehicle working position side and an opposite vehicle working position side. An automated transport system identifies a target workpiece stocker and a target workpiece setting member for an operation to be performed by a robot mounted on an automated guided vehicle and drives a pullout restriction mechanism unit to prevent the workpiece setting member from being pulled out to the opposite vehicle working position side or being pulled out to the vehicle working position side before the automated guided vehicle arrives at a working position and the robot pulls out the workpiece setting member to the vehicle working position side after the identification.

6 Claims, 10 Drawing Sheets

FIG. 1

Stocker width direction

First side   Stocker depth direction   Second side

WORKPIECE STOCKER

TECHNICAL FIELD

The present invention relates to a workpiece stocker.

BACKGROUND ART

A known exemplary automated transport system is disclosed in International Publication No. WO 2018/092222 (Patent Literature 1).

This automated transport system includes two workpiece stockers, namely, a material storage that stores material workpieces to be supplied to a machine tool and a product storage that stores workpieces machined by the machine tool.

This automated transport system further includes an autonomous robot control unit that controls an automated guided vehicle and a robot. Under control by the autonomous robot control unit, the automated guided vehicle travels to working positions respectively set for the machine tool, the material storage, and the product storage. Specifically, the autonomous robot control unit receives a work request sent from a machine tool control unit provided for the machine tool and generates a job (work plan) for the automated guided vehicle and the robot based on the received work request. The work request sent from the machine tool control unit includes a request for causing the automated guided vehicle and the robot to carry out workpiece transport.

The workpiece transport includes a material transport operation of transporting an unmachined workpiece from the material storage to the machine tool and a finished product transport operation of transporting a machined workpiece from the machine tool to the product storage. In the material transport operation, the robot moves a workpiece from the material storage onto a transport table of the automated guided vehicle, and subsequently attaches the workpiece to the machine tool after the automated guided vehicle arrives at the working position for the machine tool. In the finished product transport operation, the robot detaches a workpiece from the machine tool and moves the workpiece onto the transport table of the automated guided vehicle, and subsequently moves the workpiece into the product storage after the automated guided vehicle arrives at the working position for the product storage.

CITATION LIST

Patent Literature

[Patent Literature 1] International Publication No. WO 2018/092222

SUMMARY OF INVENTION

Technical Problem

In the automated transport system disclosed in Patent Literature 1, movements of workpieces between the material storage and product storage (workpiece stockers) and the machine tool are performed by the robot on the automated guided vehicle, while operations such as material workpiece filling and product workpiece collection to and from the workpiece stockers are performed by an operator.

Where two entities, namely, the robot on the automated guided vehicle and a human (operator) perform work to the workpiece stockers as described above, it is possible that an operation to be performed by the automated guided vehicle and the robot in accordance with the job is hindered by an operation performed by the operator.

Specifically, in the automated transport system disclosed in Patent Literature 1, for example, if a workpiece erroneously set by the operator is present in the product storage (workpiece stocker) when the robot on the automated guided vehicle tries to store a machined workpiece into the workpiece stocker in accordance with the job generated by the autonomous robot control unit (job generation unit), the robot is unable to carry out the workpiece storing operation (workpiece set operation) to the workpiece stocker.

Further, for example, if the operator erroneously has carried away the material workpieces from the material storage (workpiece stocker) when the robot on the automated guided vehicle tries to extract a material workpiece from the workpiece stocker in accordance with the job generated by the job generation unit, the robot is unable to carry out the material workpiece extracting operation.

In addition, each workpiece stocker in the automated transport system disclosed in Patent Literature 1 is composed of a placement table having a workpiece placement surface on the top thereof, which causes a problem that, where two entities, namely, the robot on the automated guided vehicle and a human (operator), perform work to the workpiece stocker, access paths to the workpiece stocker concentrate on the upper side of the workpiece stocker, so that an operation to be performed by the robot may be hindered by an operation being performed by the operator.

The present invention has been achieved in view of the above-described circumstances, and an object of the invention is to prevent an operation to be performed on a workpiece stocker by a robot on an automated guided vehicle in accordance with a job generated by a job generation unit from being hindered by an operation performed or being performed on the workpiece stocker by an operator.

Solution to Problem

An aspect of the present invention includes:

a workpiece stocker that has a workpiece setting member for setting a workpiece thereon and houses the workpiece setting member such that the workpiece setting member is able to be pulled out from a predetermined housed position to a vehicle working position side and an opposite vehicle working position side as both sides along a predetermined pullout path;

an automated guided vehicle that is configured to travel to a vehicle working position set for the workpiece stocker;

a robot that is mounted on the automated guided vehicle and is configured to, with the automated guided vehicle stopped at the vehicle working position, pull out the workpiece setting member of the workpiece stocker from the predetermined housed position to the vehicle working position side and perform a workpiece set operation or a workpiece extraction operation;

a job generation unit that is configured to obtain a workpiece stock status in the workpiece stocker and generate, based on the obtained workpiece stock status, a job to be carried out by the automated guided vehicle and the robot;

an operation control unit that is configured to control the automated guided vehicle and the robot in accordance with the job generated by the job generation unit;

a pullout restriction mechanism unit that is provided for the workpiece stocker and is configured to be switchable between a restriction state in which the pullout restriction mechanism unit restricts movement of the workpiece setting member such that the workpiece setting member cannot be pulled out from the predetermined housed position to at least the opposite vehicle working position side and an restriction-release state in which the pullout restriction mechanism unit releases the restriction of movement of the workpiece setting member; and a pullout control unit that is configured to control driving of the pullout restriction mechanism unit, wherein the pullout control unit is configured to, when recognizing based on the job generated by the job generation unit that the automated guided vehicle is to be moved to the vehicle working position set for the workpiece stocker, execute a prohibition control operation of identifying the workpiece stocker and workpiece setting member specified in the job as the target for the operation to be performed by the robot, controlling the pullout restriction mechanism unit to the restriction state, and prohibiting switching of the pullout restriction mechanism unit from the restriction state to the restriction-release state to prevent the workpiece setting member from being pulled out to the opposite vehicle working position side before the automated guided vehicle arrives at the vehicle working position and the robot pulls out the workpiece setting member to the vehicle working position side after the identification.

In an automated transport system according to this aspect of the present invention, the following prohibition control operation is executed by the pullout control unit to prevent the operation to be performed on the workpiece setting member by the robot in accordance with the job from being hindered by an operator. That is to say, in the prohibition control operation, the pullout control unit first identifies, based on the job generated by the job generation unit, the workpiece stocker and workpiece setting member as the target for the operation to be performed by the robot. Subsequently, the pullout control unit controls the pullout restriction mechanism unit to the restriction state and prohibits switching of the pullout restriction mechanism unit from the restriction state to the restriction-release state to prevent the workpiece setting member from being pulled out to the opposite vehicle working position side before the automated guided vehicle arrives at the vehicle working position and the robot pulls out the workpiece setting member to the vehicle working position side after the identification.

Thus, movement of the workpiece setting member to the opposite vehicle working position side is restricted by the pullout restriction mechanism unit until the automated guided vehicle arrives at the vehicle working position and the robot starts the operation. This prevents the workpiece setting member from being pulled out to the opposite vehicle working position side by the operator before the automated guided vehicle arrives at the vehicle working position for the workpiece stocker after the job is generated by the job generation unit; consequently, the workpiece set operation or workpiece extraction operation to be performed by the robot in accordance with the job is prevented from being hindered by the operator carrying away a workpiece supposed to be present on the workpiece setting member or unnecessarily setting a workpiece onto the workpiece setting member. In addition, the workpiece stocker is of a two-side pullout type. Therefore, differently from a workpiece stocker composed of a simple placement table, access paths to the workpiece stocker do not concentrate on only the top of the workpiece stocker. Consequently, the operation to be performed by the robot in accordance with the job is reliably prevented from being hindered by an operation being performed by the operator.

It is preferred that the pullout restriction mechanism unit is configured to, in the restriction state, restrict movement of the workpiece setting member such that the workpiece setting member cannot be pulled out from the predetermined housed position to both sides.

In this configuration, when the prohibition control operation is executed by the pullout control unit, the pullout restriction mechanism unit is set to the restriction state and thereby movement of the workpiece setting member to both sides along the predetermined pullout path is prohibited. This not only prevents the workpiece setting member from being pulled out to the opposite vehicle working position side by the operator but also avoids a situation in which the operator goes around to the vehicle working position side and pulls out the workpiece setting member. Therefore, the situation in which the operator pulls out the workpiece setting member and performs work to the workpiece setting member before the automated guided vehicle arrives at the working position is more reliably avoided.

It is preferred that the pullout control unit is configured to, when pullout of the workpiece setting member restricted in movement to both sides by the execution of the prohibit control operation is to be performed, determine whether the working entity for the pullout is the robot on the automated guided vehicle stopped at the vehicle working position or not, when determining that the working entity is the robot, switch the pullout restriction mechanism unit from the restriction state to the restriction-release state, and when determining that the working entity is not the robot, continue to prohibit switching of the pullout restriction mechanism unit to the restriction-release state.

In this configuration, when pullout of the workpiece setting member is to be performed after the execution of the prohibit control operation, the pullout control unit determines whether the working entity for the pullout is the robot on the automated guided vehicle stopped at the vehicle working position or not. When the pullout control unit determines that the working entity is the robot on the automated guided vehicle, the pullout restriction mechanism unit is switched to the restriction-release state. On the other hand, when the pullout control unit determines that the working entity is not the robot on the automated guided vehicle, the workpiece setting member remains restricted by the pullout restriction mechanism unit. Therefore, the workpiece setting member is reliably prevented from being pulled out by a working entity other than the robot mounted on the automated guided vehicle before the automated guided vehicle arrives at the vehicle working position.

It is preferred that the workpiece stocker is configured such that the workpiece setting member can be pulled out from the predetermined housed position to the opposite vehicle working position side by the operator when the pullout restriction mechanism unit is in the restriction-release state.

With this configuration, the operator can pull out the workpiece setting member and performs material workpiece setting and finished workpiece collection without entering the working area of the automated guided vehicle and robot (i.e., the vehicle working position side). This maximally improves the working efficiency and the safety. Thus, the automated transport system according to this aspect of the present invention is particularly useful for the configuration in which the operator and the robot perform work to the workpiece stocker from opposite sides of the workpiece stocker.

It is preferred that:

the pullout restriction mechanism unit has a locking member and is configured to restrict movement of the workpiece setting member to at least the opposite vehicle working position side using the locking member in the restriction state and to release the restriction of movement of the workpiece setting member using the locking member in the restriction-release state;

there are further provided:

an unlocking operation unit that is arranged on the opposite vehicle working position side on the workpiece stocker; and an interlocking mechanism unit that is configured to switch the pullout restriction mechanism unit from the restriction state to the restriction-release state by driving the locking member along with operation of the unlocking operation unit; and in the prohibition control operation, the pullout control unit controls the pullout restriction mechanism unit to the restriction state and disables operation of the unlocking operation unit.

With this configuration, the operator can release the restriction of the workpiece setting member by the pullout restriction mechanism unit by operating the unlocking operation unit arranged on the opposite vehicle working position side on the workpiece stocker. When the unlocking operation unit is operated, the locking member is driven by the interlocking mechanism unit so that the restriction of the workpiece setting member by the pullout restriction mechanism unit is released. In the prohibition control operation by the pullout control unit, operation of the unlocking operation unit is disabled. Therefore, when the prohibition control operation is executed, switching of the pullout restriction mechanism unit from the restriction state to the restriction-release state is reliably prohibited.

Another aspect of the present invention includes:

a workpiece stocker that has a workpiece setting member for setting a workpiece thereon and houses the workpiece setting member such that the workpiece setting member is able to be pulled out from a predetermined housed position to a vehicle working position side and an opposite vehicle working position side as both sides along a predetermined pullout path;

an automated guided vehicle that is configured to travel to a vehicle working position set for the workpiece stocker;

a robot that is mounted on the automated guided vehicle and is configured to, with the automated guided vehicle stopped at the vehicle working position, pull out the workpiece setting member of the workpiece stocker from the predetermined housed position to the vehicle working position side and perform a workpiece set operation or a workpiece extraction operation;

a job generation unit that is configured to obtain a workpiece stock status in the workpiece stocker and generate, based on the obtained workpiece stock status, a job to be carried out by the automated guided vehicle and the robot;

an operation control unit that is configured to control the automated guided vehicle and the robot in accordance with the job generated by the job generation unit;

a pullout restriction mechanism unit that is provided for the workpiece stocker and is configured to be switchable between a restriction state in which the pullout restriction mechanism unit restricts movement of the workpiece setting member such that the workpiece setting member cannot be pulled out from the predetermined housed position to at least the vehicle working position side and an restriction-release state in which the pullout restriction mechanism unit releases the restriction of movement of the workpiece setting member; and a pullout control unit that is configured to control driving of the pullout restriction mechanism unit, wherein the pullout control unit is configured to, when recognizing based on the job generated by the job generation unit that the automated guided vehicle is to be moved to the vehicle working position set for the workpiece stocker, execute a prohibition control operation of identifying the workpiece stocker and workpiece setting member specified in the job as the target for the operation to be performed by the robot, controlling the pullout restriction mechanism unit to the restriction state, and prohibiting switching of the pullout restriction mechanism unit from the restriction state to the restriction-release state to prevent the workpiece setting member from being pulled out to the vehicle working position side before the automated guided vehicle arrives at the vehicle working position and the robot pulls out the workpiece setting member to the vehicle working position side after the identification.

In an automated transport system according to this other aspect of the present invention, the side where pullout of the workpiece setting member is restricted by the pullout restriction mechanism unit is different from that in the automated transport system according to the above-described aspect. That is to say, the automated transport system according to the above-described aspect is configured such that pullout of the workpiece setting member to the opposite vehicle working position side is prohibited using the pullout restriction mechanism unit, while the automated transport system according to this other aspect is configured such that pullout of the workpiece setting member to the vehicle working position side is prohibited using the pullout restriction mechanism unit.

With this configuration, where the robot mounted on the automated guided vehicle and the operator can perform work to the workpiece stocker on the vehicle working position side of the workpiece stocker, the situation in which the operator pulls out the workpiece setting member to the working position side and performs work to the workpiece setting member before the automated guided vehicle arrives at the working position (vehicle working position) and thereby the operation to be thereafter performed by the robot is hindered is avoided.

In the automated transport system according to this other aspect, it is preferred that the pullout restriction mechanism unit is configured to, in the restriction state, restrict movement of the workpiece setting member such that the workpiece setting member cannot be pulled out from the predetermined housed position to both sides.

With this configuration, the situation in which the operator pulls out the workpiece setting member and performs work to the workpiece setting member before the automated guided vehicle arrives at the vehicle working position is more reliably avoided.

In the automated transport system according to this other aspect, it is preferred that the pullout control unit is configured to, when pullout of the workpiece setting member restricted in movement to at least the vehicle working position side by the execution of the prohibit control operation is to be performed, determine whether the working entity for the pullout is the robot on the automated guided vehicle stopped at the vehicle working position or not, when determining that the working entity is the robot, switch the pullout restriction mechanism unit from the restriction state to the restriction-release state, and when determining that the working entity is not the robot, continue to prohibit switching of the pullout restriction mechanism unit to the restriction-release state.

With this configuration, the workpiece setting member is reliably prevented from being pulled out to the vehicle working position side by a working entity other than the robot mounted on the automated guided vehicle before the automated guided vehicle arrives at the vehicle working position.

It is preferred that the workpiece stocker is configured such that the workpiece setting member can be pulled out from the housed position to the vehicle working position side not only by the robot on the automated guided vehicle but also by the operator when the pullout restriction mechanism unit is in the restriction-release state.

With this configuration, the operator and the robot on the automated guided vehicle can pull out the workpiece setting member and perform work to the workpiece setting member from the same side of the workpiece stocker. Therefore, for example, when the robot on the automated guided vehicle becomes inoperable due to a failure or the like, the operator in place of the robot can perform the workpiece set operation and the like on the workpiece setting member. Thus, the automated transport system according to this other aspect of the present invention is particularly useful for the configuration in which the operator and the robot perform work to the workpiece stocker from the same side of the workpiece stocker.

In the automated transport system according to this other aspect, it is preferred that:

the pullout restriction mechanism unit has a locking member and is configured to restrict movement of the workpiece setting member to at least the vehicle working position side using the locking member in the restriction state and to release the restriction of movement of the workpiece setting member using the locking member in the restriction-release state;

there are further provided:

an unlocking operation unit that is arranged on the vehicle working position side on the workpiece stocker; and an interlocking mechanism unit that is configured to switch the pullout restriction mechanism unit from the restriction state to the restriction-release state by driving the locking member along with operation of the unlocking operation unit; and in the prohibition control operation, the pullout control unit controls the pullout restriction mechanism unit to the restriction state and disables operation of the unlocking operation unit.

In this configuration, when the prohibition control operation is executed by the pullout control unit, operation of the unlocking operation unit that is means for the operator to switch the pullout restriction mechanism unit to the restriction-release state is disabled. Therefore, switching of the pullout restriction mechanism unit from the restriction state to the restriction-release state is reliably prohibited.

It is preferred that the workpiece stocker has a plurality of workpiece setting members and the pullout restriction mechanism unit is provided for each of the plurality of workpiece setting members.

With this configuration, since the pullout restriction mechanism unit is provided for each of the plurality of workpiece setting members, it is possible to perform control such that only the pullout restriction mechanism unit for the workpiece setting member specified in the job as the target for the operation to be performed by the robot is set to the restriction state and the pullout restriction mechanism units for the remaining workpiece setting members are set to the restriction-release state. Therefore, it is possible to prevent unnecessary prohibition of pullout of the workpiece setting members not as the target for the operation to be performed by the robot.

Advantageous Effects of Invention

As described above, the automated transport system according to the present invention is configured such that the workpiece setting member of the workpiece stocker is able to be pulled out to the vehicle working position side and the opposite vehicle working position side and once a job is generated by the job generation unit, the workpiece stocker and workpiece setting member specified in the job as the target for the operation to be performed by the robot are identified and pullout of the workpiece setting member to at least the vehicle working position side or at least the opposite vehicle working position side is restricted by the pullout restriction mechanism unit so that the workpiece setting member is not pulled out to the vehicle working position side or the opposite vehicle working position side before the automated guided vehicle arrives at the vehicle working position and the robot pulls out the workpiece setting member after the identification. Therefore, the automated transport system according to the present invention is able to prevent the operation to be performed on the workpiece stocker by the robot on the automated guided vehicle in accordance with the job from being hindered by an operation performed or being performed on the workpiece stocker by the operator.

BRIEF DESCRIPTION OF DRAWINGS

FIG. 1 is a schematic plan view illustrating a production system to which an automated transport system according to an embodiment of the present invention is applied;

DESCRIPTION OF EMBODIMENTS

Figure 2:
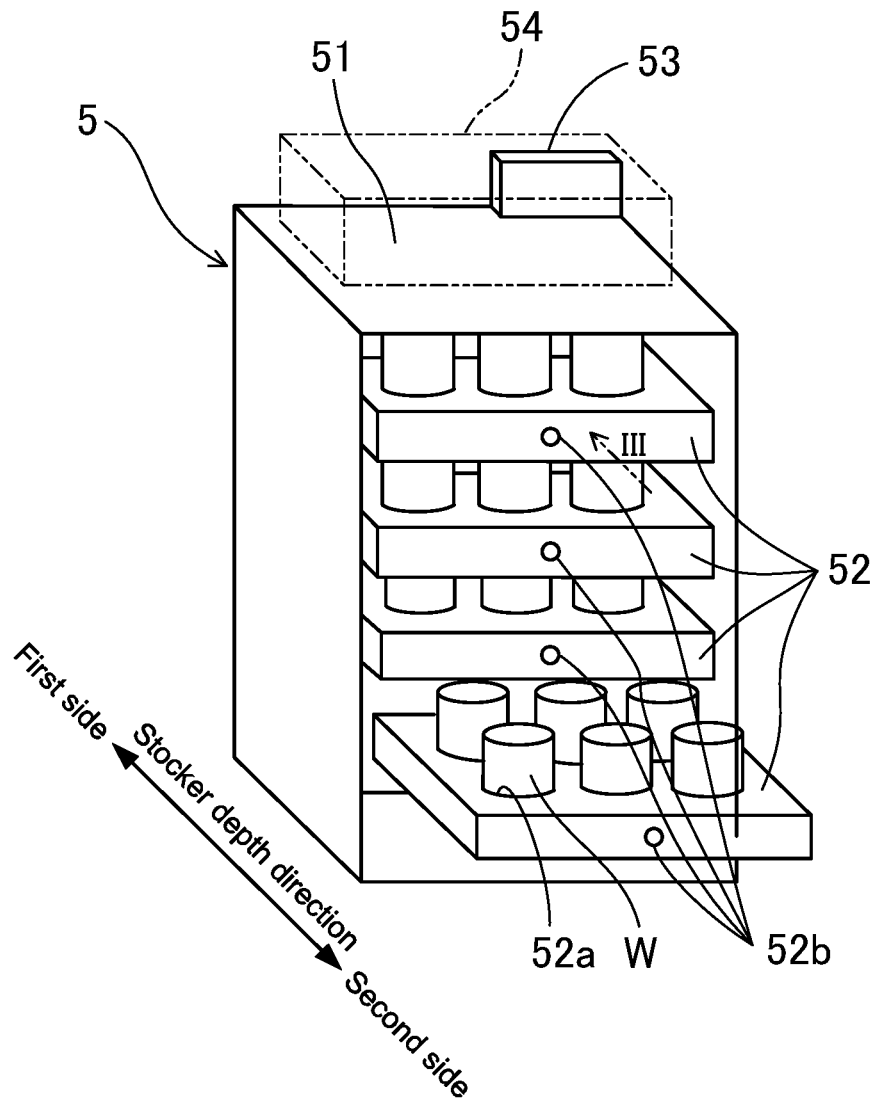
FIG. 2 is a perspective view illustrating a schematic structure of a workpiece stocker used in the production system.

Hereinafter, a specific embodiment of the present invention will be described with reference to the drawings.

Embodiment

Figure 1:
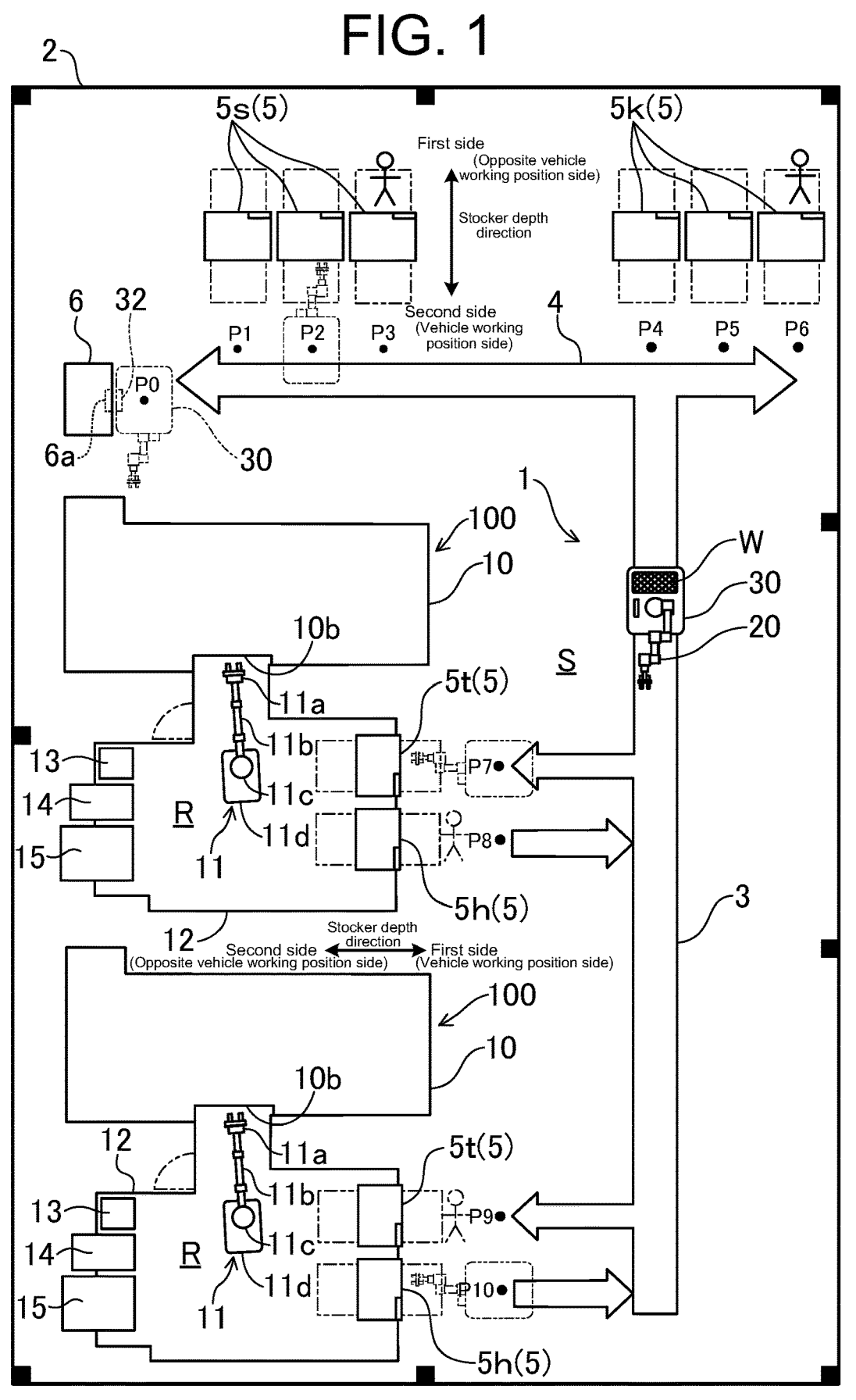

FIG. 1 is a schematic plan view illustrating a production system S to which an automated transport system 1 according to an embodiment of the present invention is applied. This production system S is installed in a factory building 2 and has a main passage 3 and a sub-passage 4 set on a floor of the building 2. The main passage 3 extends in a vertical direction in FIG. 1. The sub-passage 4 extends in a horizontal direction in FIG. 1 and is connected to one end of the main passage 3. The production system S includes two machining cells 100 arranged along the main passage 3 on the left side of the main passage 3, a plurality of workpiece stockers 5 for storing workpieces W, and a machining cell controller 80 (see FIG. 9 described later) controlling the machining cells 100.

The automated transport system 1 includes an automated guided vehicle (AGV) 30, a robot (hereinafter, referred to as "AGV robot") 20 mounted on the automated guided vehicle 30, an overall transport controller 60 fixedly disposed at a predetermined position in the building 2, and an AGV controller 70 mounted on the automated guided vehicle 30. Under control by the overall transport controller 60 and the AGV controller 70, the automated guided vehicle 30 transports workpieces W while traveling between predetermined working positions P1 to P10 respectively set for the workpiece stockers 5. By the automated guided vehicle 30 making a stop at a charging position P0 set at the left end of the sub-passage 4 in FIG. 1, power is supplied to the automated guided vehicle 30 from a power supply station 6 so that a battery 35 (see FIG. 9 described later) is charged. The power supply station 6 in this example employs a non-contact power supply method. However, the power supply station 6 is not limited to such a power supply method and may employ a contact power supply method. This configuration of the production system S installed in the building 2 is just an example and the production system S is not limited to this configuration. The production system S may include any industrially used apparatus or device and further is not limited to the layout of this example configuration.

The plurality of workpiece stockers 5 consists of three material stockers 5s, three finished product stockers 5k, loading stockers 5t, and unloading stockers 5h. The material stockers 5s each store material workpieces W. The finished product stockers 5k each store finished workpieces W. The loading stockers 5t are provided one for each of the machining cells 100 and each temporarily store material workpieces W to be loaded into the associated machining cell 100. The unloading stockers 5h are provided one for each of the machining processing cells 100 and each temporarily store finished workpieces W unloaded from the associated machining cell 100. The three material stockers 5s are disposed on the left side with respect to the main passage 3 at the upper side (the side opposite to the machining cell 100 side) of the sub-passage 4 in FIG. 1. The three finished product stockers 5k are disposed on the extension of the main passage 3 and the right side with respect to the main passage 3 at the upper side (the side opposite to the machining cell 100 side) of the sub-passage 4 in FIG. 1. In the following description, each workpiece stocker is simply referred to as "workpiece stocker 5" when there is no need to distinguish the material stocker 5s, the finished product stocker 5k, the loading stocker 5t, and the unloading stocker 5h from one another. Further, each workpiece is referred to with reference W and is simply referred to as "workpiece W" when there is no need to distinguish the material workpiece W and the finished workpiece W from each other.

The workpiece stocker 5 is of a two-side pullout type, so that the workpiece stocker 5 can be operated from both sides in a stocker depth direction (from both sides on the stocker depth direction) thereof, which is described later. The workpiece stocker 5 has an operation panel 53 (see FIG. 2) that is described later. In the following description, the side in the stocker depth direction where the operation panel 53 is arranged is designated as "first side" and the side opposite to the first side in the stocker depth direction is designated as "second side".

The operational entities on the first and second sides in the stocker depth direction of each workpiece stocker 5 differ from each other. Specifically, as for each of the material stockers 5s and finished product stockers 5k, the working entity on the first side (the upper side in FIG. 1) in the stocker depth direction is a human (operator), while the working entity on the second side (the lower side in FIG. 1) in the stocker depth direction is the AGV robot 20. As for each of the material stockers and finished product stockers 5k, the second side (the lower side in FIG. 1) in the stocker depth direction corresponds to the side of the working position P1 to P6 for the automated guided vehicle (AGV) 30, i.e., the vehicle working position side, while the first side (the upper side in FIG. 1) in the stocker depth direction corresponds to the opposite vehicle working position side.

As for each of the loading stockers 5t and unloading stockers 5h, the working entity on the first side (the right side in FIG. 1) in the stocker depth direction is the AGV robot 20, while the working entity on the second side (the left side in FIG. 1) in the stocker depth direction is a cell robot 11 provided in the associated machining cell 100 that is described later. As for each of the loading stockers 5t and unloading stockers 5h, the first side (the right side in FIG. 1) in the stocker depth direction corresponds to the side of the working position P7 to P10 for the automated guided vehicle (AGV) 30, i.e., the vehicle working position side, while the second side (the left side in FIG. 1) in the stocker depth direction corresponds to the opposite vehicle working position side. Note that, although, as described above, the working entity on the first side (the right side in FIG. 1, i.e., the vehicle working position side) in the stocker depth direction for each of the loading stockers 5t and unloading stockers 5h is basically the AGV robot 20, the working entity can be a human (operator) in place of the AGV robot 20, for example, if the automated guided vehicle 30 becomes inoperable due to some cause.

[Configuration of Machining Cell]

Each machining cell 100 includes a machine tool 10 (an example of the machining machine) machining a workpiece W, a cell robot 11 (an example of the loading and unloading device) loading and unloading the workpiece W into and from the machine tool 10, a cleaning device 14 cleaning the machined workpiece W, and a drying device 15 drying the cleaned workpiece W. That is to say, the production process in the machining cell 100 has three steps, namely, a machining step of machining a workpiece W in the machine tool 10, a cleaning step of cleaning the workpiece W in the cleaning device 14, and a drying step of drying the workpiece W in the drying device 15.

Note that the machine tool 10 can be composed of any one of various known machine tools. For example, the machine tool 10 is composed of a typical NC (numerically controlled) combined machining machine tool that includes a workpiece spindle on which a chuck for gripping a workpiece W is mounted, a turret on which a turning tool or the like is arranged, and a tool rest having a tool spindle by which a rotary tool or the like is held.

Figure 9:
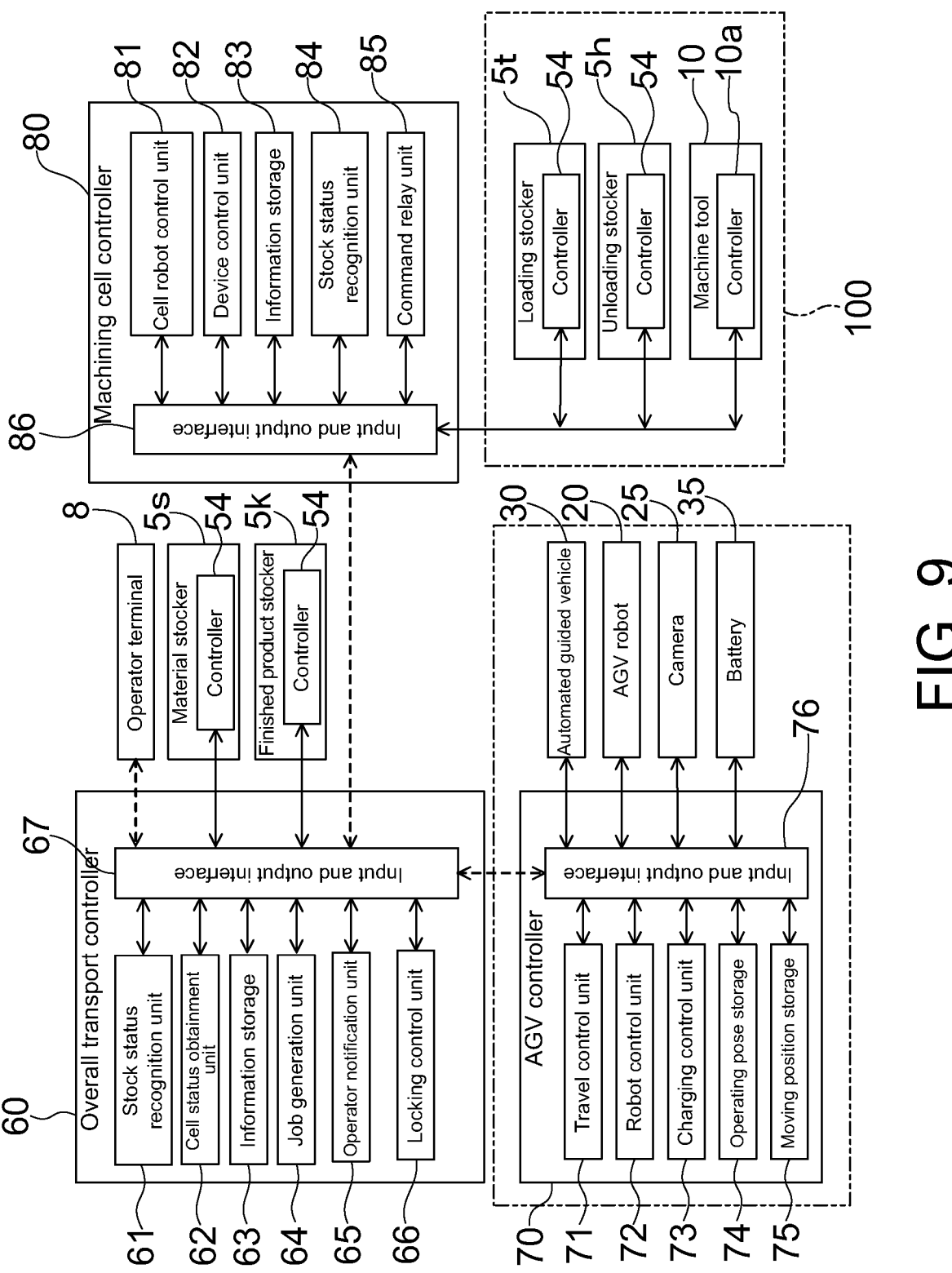
FIG. 9 is a block diagram illustrating a configuration for control of the whole production system to which the automated transport system according to the embodiment is applied.

The machine tool 10 performs automatic machining of a workpiece Win accordance with an NC program under control by a controller 10a (see FIG. 9). The machine tool 10 has an opening 10b formed in the front face thereof, which is opened and closed by an opening and closing door. To this opening 10, a fence 12 defining a working area R of the cell robot 11 is connected. The cell robot 11 is composed of an articulated robot and is arranged at the center of the working area R. The cell robot 11 has a hand 11a, an arm 11b, a turning unit 11c, and a base 11d. The hand 11a grips a workpiece W and the arm 11b supports the hand 11a at the distal end thereof. The base of the arm 11b is fixed to the turning unit 11c and the turning unit 11c is turnable about a vertical axis. The base 11d fixes the turning unit 11c to the floor. At the right end of the working area R in FIG. 1, the associated loading stocker 5t and unloading stocker 5h are arranged side by side in the direction along the main passage 3. At the left end of the working area R in FIG. 1, a temporary placement table 13 for temporarily placing workpieces W thereon, the cleaning device 14, and the drying device 15 are arranged side by side in the direction along the main passage 3.

In automatic running, the cell robot 11 repeats a predetermined cycle operation under control by the machining cell controller 80 that is described later. In the cycle operation, the cell robot 11 unloads a machined workpiece W from the machine tool 10 and temporarily places the workpiece W onto the temporary placement table 13. Thereafter, the cell robot 11 extracts an unmachined workpiece W stored in the associated loading stocker 5t and loads the workpiece W into the machine tool 10. While the machine tool 10 is performing the machining step on the workpiece W, the cell robot 11 grips the workpiece W temporarily placed on the temporary placement table 13, puts the workpiece W through the cleaning device 14 and the drying device 15, and then unloads the workpiece W into the associated unloading stocker 5h.

[Structure of Workpiece Stocker]

Next, the structure of the workpiece stocker 5 is described with reference to FIG. 2. The workpiece stocker 5 has a housing frame 51 and four workpiece setting boards 52 (an example of the workpiece setting member). The housing frame 51 has a rectangular box shape and is open to both sides in a depth direction thereof. The workpiece setting boards 52 are arranged at intervals in the vertical direction. Each workpiece setting board 52 has on an upper surface thereof six cylindrical stock holes 52a formed in two rows and three columns. Each stock hole 52a surrounds and supports the lower end of a workpiece W. Each workpiece setting board 52 is configured to be slidable from a predetermined housed position in the housing frame 51 to both sides in the stocker depth direction. The predetermined housed position is, for example, a position at which the workpiece setting board 52 is entirely housed inside the housing frame 51. FIG. 2 shows a state where the first through third workpiece setting boards 52 from the top are positioned at the predetermined housed position.

The housing frame 51 has the operation panel 53 fixed to a corner on the first side in the stocker depth direction of a top surface thereof, which is operated by an operator. The housing frame 51 further has a controller 54 for the workpiece stocker 5 fixed to a central portion of the top surface thereof.

The workpiece setting board 52 has a cylindrical hole 52b formed in each side surface in the sliding direction (the stocker depth direction). The cylindrical hole 52b is formed at the center in a width direction (direction orthogonal to the sliding direction) of the workpiece setting board 52 and is used as an insertion hole for inserting a connecting rod 27 (see FIG. 8 described later) when the workpiece setting board 52 is slid by the AGV robot 20, which is described later.

Figure 3:
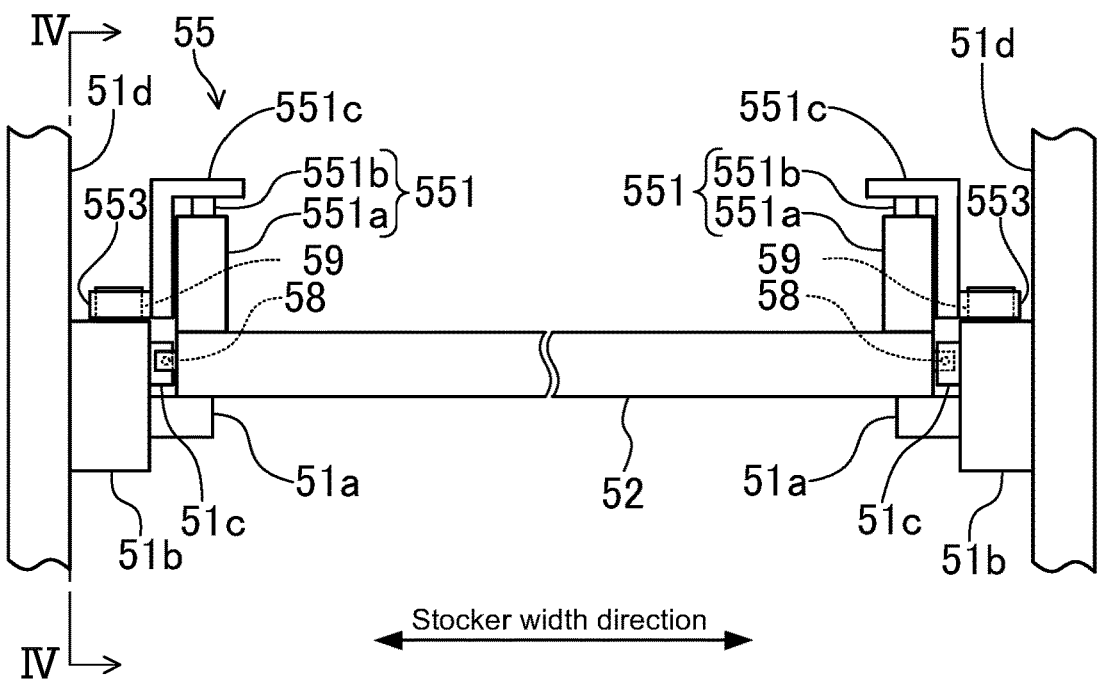
FIG. 3 is a view as viewed in the direction of arrow III in FIG. 2.
Figure 4:
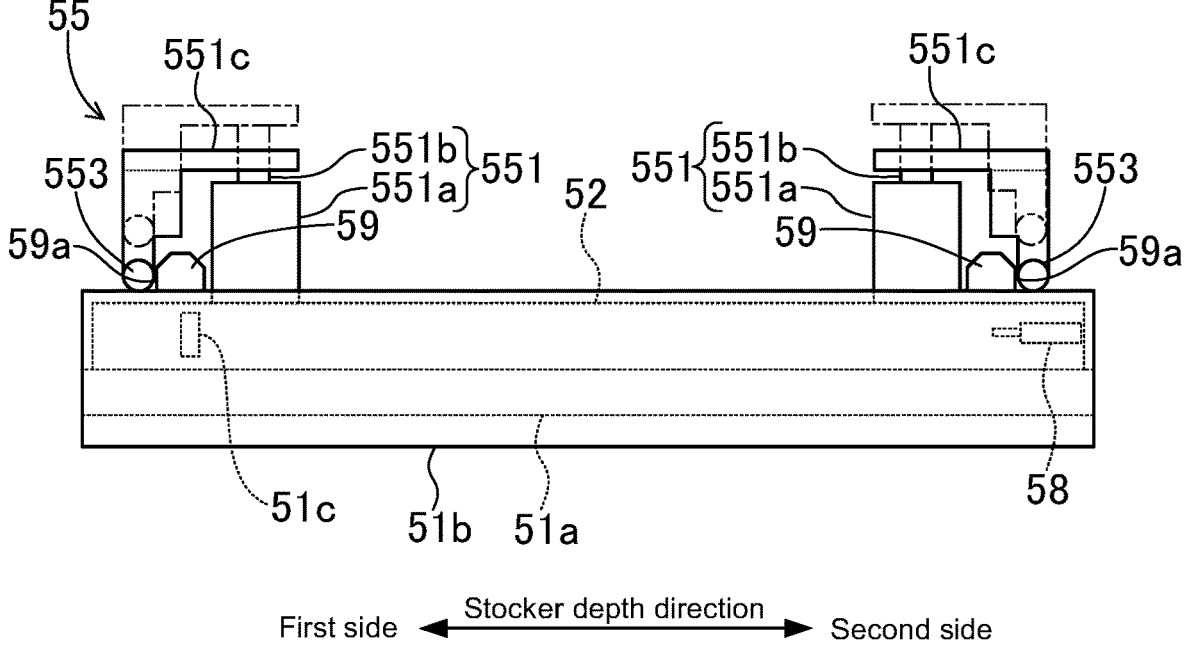
FIG. 4 is a cross-sectional view taken along line IV-IV in FIG. 3.

As illustrated in FIGS. 3 and 4, the workpiece setting board 52 is supported by a pair of support rails 51a from below. The support rails 51a respectively protrude inward from inner side surfaces of a pair of side beams 51b opposed to each other in a stocker width direction and extend in the stocker depth direction. The workpiece setting board 52 is slidable to both sides in the stocker depth direction along upper surfaces of the pair of support rails 51a. Note that the support rails 51a may have any configuration as long as they are able to support the workpiece setting board 52 such that the workpiece setting board 52 is movable. For example, the support rails 52 may be composed of slide rails formed by a plurality of slide plates extendably coupled to each other.

The workpiece setting board 52 has shock absorbers 58 (see FIG. 4) respectively arranged on both side surfaces in the stocker width direction. Each shock absorber 58 has an axis extending in the stocker depth direction. The shock absorbers 58 are arranged diagonally across the center of the workpiece setting board 52 in plan view. When the workpiece setting board 52 is pulled out to the first side and the second side in the stocker depth direction, the shock absorbers 58 respectively come into contact with stopper plates 51c protruding from the inner side surfaces of the pair of side beams 51. Thus, the maximum pullout position of the workpiece setting board 52 is restricted.

The pair of side beams 51b are respectively fixed to inner side surfaces of a pair of side walls 51d opposed to each other in the stocker width direction in the housing frame 51. The side beams 51b extend throughout the length of the housing frame 51 in the stocker depth direction. Each side beam 51b has two locked protrusions 59 on an upper surface thereof. The two locked protrusions 59 are respectively arranged at both ends in the stocker depth direction of the side beam 51b. Each locked protrusion 59 is composed of a trapezoidal block member extending along the stocker depth direction and having a thickness in the stocker width direction.

The locked protrusion 59 is configured such that an end surface thereof facing outward in the stocker depth direction functions as a restricting surface 59a restricting movement of a locking pin 553 that is described later.

[Controller for Workpiece Stocker]

Figure 5:
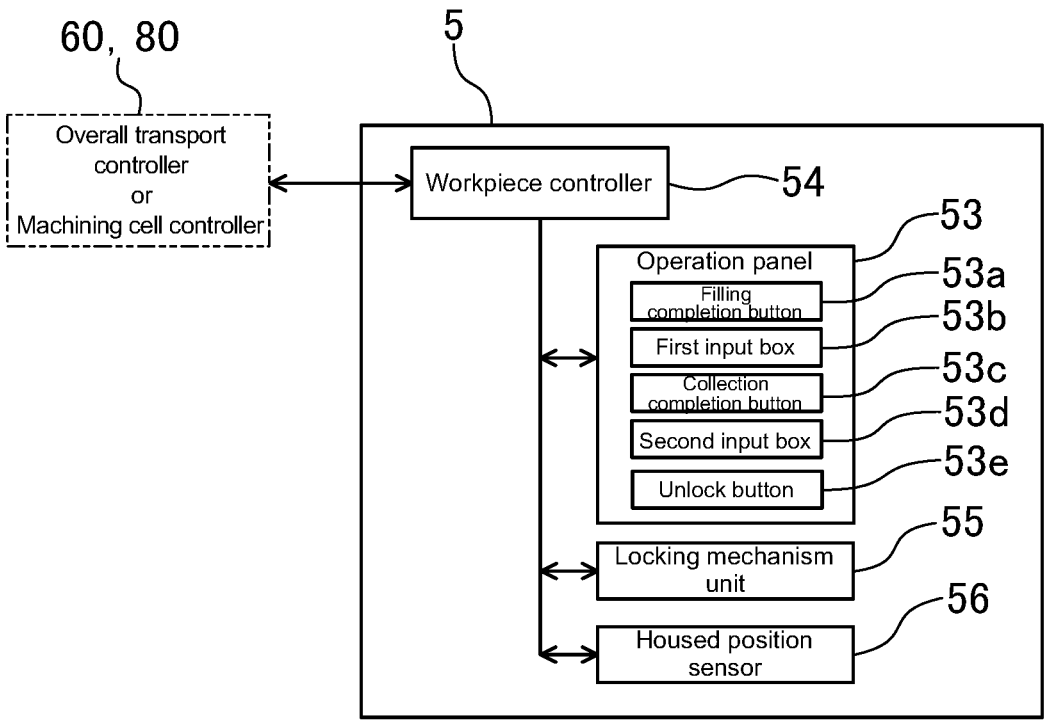
FIG. 5 is a block diagram illustrating a configuration for control of the workpiece stocker.

As illustrated in FIG. 5, the controller 54 for the workpiece stocker 5 is composed of a microcomputer including a CPU, a ROM, and a RAM and is electrically connected to the operation panel 53, locking mechanism units 55 (an example of the pullout restriction mechanism unit), and housed position sensors 56. In the following description, the controller 54 is referred to as "stocker controller 54" when there is no need to distinguish the type of the workpiece stocker 5 to be controlled.

The operation panel 53 is composed of, for example, a liquid crystal touch panel. The touch panel has thereon a filling completion button 53*a* to be operated by the operator when filling of workpieces W into any of the workpiece setting boards 52 is completed, a first input box 53*b* for inputting on which layer the workpiece setting board 52 as the target for the filling of workpieces W is located, a collection completion button 53*c* to be operated when collection of workpieces W from any of the workpiece setting boards 52 is completed, a second input box 53*d* for inputting on which layer the workpiece setting board 52 as the target for the collection of workpieces W is located, and a unlock button 53*e* (an example of the unlocking operation unit) for manually releasing locking (restriction) of any of the workpiece setting boards 52 by the associated locking mechanism unit 55.

The operation panel 53 transmits operation signals of the filling completion button 53*a*, collection completion button 53*c*, and unlock button 53*e* as well as information input from the input boxes 53*b* and 53*d* to the stocker controller 54. Note that the buttons 53*a*, 53*c*, and 53*e* and input boxes 53*b* and 53*d* of the operation panel are not limited to being displayed in a software manner on the touch panel as in this example and may be composed of physical hardware keys.

The housed position sensors 56 are respectively provided for the four workpiece setting boards 52. Each housed position sensor 56 detects that the associated workpiece setting board 52 is positioned at the predetermined housed position. Upon detecting that the associated workpiece setting board 52 is positioned at the predetermined housed position, the housed position sensor 56 transmits a detection signal to the stocker controller 54.

The locking mechanism unit 55 restricts pullout movement of the associated workpiece setting board 52.

As illustrated in FIGS. 3 and 4, the locking mechanism unit 55 includes air cylinders 551, a cylinder drive unit 552 (see FIG. 6), and locking pins 553. The air cylinders 551 are arranged two at each end edge extending in the stocker depth direction on the associated workpiece setting board 52 (i.e., a total of four air cylinders 551 are arranged on the associated setting board 52). The cylinder drive unit 552 drives the air cylinders 551. The locking pins 553 are respectively driven up and down by the air cylinders 551.

Each air cylinder 551 has a flat rectangular cylinder body 551*a* and a piston rod 551*b*. The cylinder body 551*a* is fixed to the upper surface of the associated workpiece setting board 52. The piston rod 551*b* is attached to a piston of the cylinder body 551*a* and moves up and down in the vertical direction. The piston rod 551*b* has a bracket 551*c* fixed to the upper end thereof, which supports the associated locking pin 553. As viewed in the stocker depth direction, the bracket 551*c* has an L-shape consisting of a horizontal plate portion and a vertical plate portion hanging down from the horizontal plate portion.

The locking pin 553 is arranged at the lower end of the vertical plate portion of the bracket 551*c* with the axis of the locking pin 553 coinciding with the stocker width direction. As viewed in the stocker depth direction, the locking pin 553 protrudes outward in the stocker width direction from the lower end of the bracket 551*c*. The locking pin 553 is movable between a locking position and an unlocking position as the air cylinder 551 moves up and down. The locking pin 553 is configured to engage with the restricting surface 59*a* of the associated locked protrusion 59 (in this embodiment, come into contact and engage with the restricting surface 59*a* of the associated locked protrusion 59) at the locking position and to be positioned above the associated locked protrusion 59 at the unlocking position.

Figure 6:
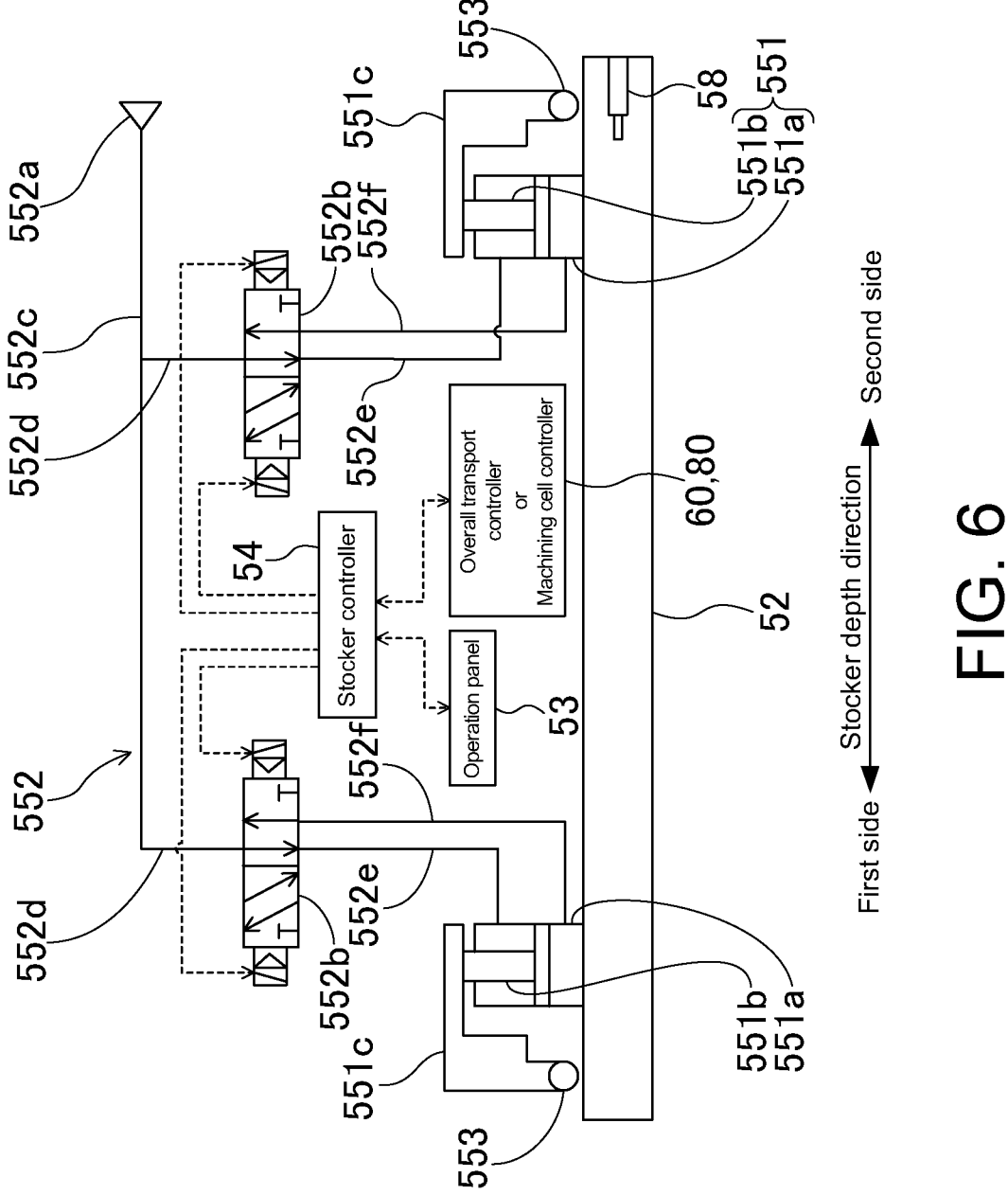
FIG. 6 is an air circuit diagram showing a configuration of a cylinder drive unit in a locking mechanism unit.

As illustrated in FIG. 6, the cylinder drive unit 552 is composed of an air circuit that switches flow paths for air supplied from an air source 552*a* to the air cylinders 551. FIG. 6 schematically illustrates the air circuit and omits illustration of some devices such as a pressure reduction valve and a check valve. Further, FIG. 6 shows the air circuit only for the two air cylinders 551 arranged at one of the end edges extending in the stocker depth direction on the associated workpiece setting board 52. The air circuit has the same configuration for the air cylinders 551 arranged at the other of the end edges; therefore, description thereof is omitted.

Specifically, the cylinder drive unit 552 includes a main flow path 552*c*, branch flow paths 552*d*, electromagnetic solenoid valves 552*b*, locking-side flow paths 552*e*, and unlocking-side flow paths 552*f*. The main flow path 552*c* is connected to the air source 552*a*. The branch flow paths 552*d* branch off from the main flow path 552*c* and respectively extend toward the air cylinders 551. The electromagnetic solenoid valves 552*b* are respectively connected to the downstream ends of the branch flow paths 552*c*. The locking-side flow paths 552*e* are respectively connected to the electromagnetic solenoid valves 552*b*, and the unlocking-side flow paths 552*f* are also respectively connected to the electromagnetic solenoid valves 552*b*. Each locking-side flow path 552*e* supplies air into an upper (locking-side) cylinder chamber in the cylinder body 551*a*. Each unlocking-side flow path 552*f* supplies air into a lower (unlocking-side) cylinder chamber in the cylinder body 551*a*.

Each electromagnetic solenoid valve 552*b* is controlled by the stocker controller 54. Specifically, upon receiving a locking drive signal from the stocker controller 54, the electromagnetic solenoid valve 552*b* supplies air supplied from the air source 552*a* into the upper cylinder chamber of the associated air cylinder 551 through the associated locking-side flow path 552*e*. Thereby, the piston rod 551*b* of the air cylinder 551 is moved downward and the associated locking pin 553 is moved to the locking position. On the other hand, upon receiving an unlocking drive signal from the stocker controller 54, the electromagnetic solenoid valve 552*b* supplies air supplied from the air source 552*a* into the lower cylinder chamber of the associated air cylinder 551 through the associated unlocking-side flow path 552*f*. Thereby, the piston rod 551*b* of the air cylinder 551 is moved upward and the associated locking pin 553 is moved to the unlocking position (see the dashed and double-dotted lines in FIG. 4).

The stocker controller 54 selectively switches each locking mechanism unit 55 between a locking state and an unlocking state by transmitting the locking drive signal or the unlocking drive signal to each electromagnetic solenoid valve 552*b* of the locking mechanism unit 55 as necessary.

In this embodiment, the locking state (corresponding to the restriction state) refers to a state where all of the four locking pins 553 have been driven to the locking position (the position indicated by the solid lines in FIG. 4) by the four air cylinders 551. When all of the four locking pins 553 are positioned at the locking position, the locking pins 553 are in contact with the restricting surfaces 59*a* of the locked protrusions 59 fixed to the pair of side beams 51*b*. Thereby, movement of the associated workpiece setting board 52 to both sides in the stocker depth direction (both sides on the stocker depth direction) is restricted.

On the other hand, the unlocking state (corresponding to the restriction-release state) refers to a state where all of the four locking pins 553 have been driven to the unlocking position (the position indicated by the dashed and double-dotted lines in FIG. 4) by the four air cylinders 551. Driving all of the four locking pins 553 to the unlocking position positions the locking pins 553 above the locked protrusions 59. Thereby, the associated workpiece setting board 52 is unlocked and allowed to move to both sides in the stocker depth direction.

The stocker controller 54 in this embodiment is config-ured to be able to execute automatic drive control of the locking mechanism unit 55 based on signals from the overall transport controller 60, described later, or the machining cell controller 80 and to execute manual drive control of the locking mechanism unit 55 based on operation signals from the operation panel 53.

First, the automatic drive control of the locking mecha-nism unit 55 is described. Upon receiving a lock command signal from the overall transport controller 60 or the machin-ing cell controller 80, the stocker controller 54 outputs the locking drive signal to each of the electromagnetic solenoid valves 552*b* connected to the four air cylinders 551 (only two of which are shown in FIG. 6), thereby moving the piston rods 551*b* as well as the locking pins 553 downward. Thus, the locking mechanism unit 55 is controlled to the locking state.

On the other hand, upon receiving an unlock command signal, the stocker controller 54 outputs the unlocking drive signal to each of the electromagnetic solenoid valves 552*b* connected to the four air cylinders 551, thereby moving the piston rods 551*b* and the locking pins 553 upward. Thus, the locking mechanism unit 55 is controlled to the unlocking state.

Further, upon receiving an unlocking prohibit command signal, the stocker controller 54 prohibits switching of the locking mechanism unit 55 from the locking state to the unlocking state. This prohibition of switching of the locking mechanism unit 55 to the unlocking state is achieved by disabling the unlock button 53*e* on the operation panel 53. That is to say, if the stocker controller 54 receives the operation signal of the unlock button 53*e* after receiving the unlocking prohibit command signal, the stocker controller 54 ignores the operation signal and maintains the locking mechanism unit 55 in the locking state.

Next, the manual drive control of the locking mechanism unit 55 is described. Upon receiving from the operation panel 53 a filling completion signal that indicates that the filling completion button 53*a* is pressed, the stocker con-troller 54 identifies based on information input from the first input box 53*b* the workpiece setting board 52 for which filling of workpieces W is completed. Upon receiving from the operation panel 53 a collection completion signal that indicates that the collection completion button 53*c* is pressed, the stocker controller 54 identifies based on infor-mation input from the second input box 53*d* the workpiece setting board 52 for which collection of workpieces W is completed. Thereafter, the stocker controller 54 determines based on the detection signal from the housed position sensor 56 whether the identified workpiece setting board 52 is positioned at the housed position or not. When determin-ing that the workpiece setting board 52 is positioned at the housed position, the stocker controller 54 outputs the lock-ing drive signal to each of the electromagnetic solenoid valves 552*b* of the locking mechanism unit 55, thereby bringing the locking mechanism unit 55 into the locking state. Thus, the filling completion signal and the collection completion signal function also as a lock command signal for the locking mechanism unit 55.

Upon receiving the operation signal of the unlock button 53*e* from the operation panel 53, the stocker controller 54 outputs the unlocking drive signal to each of the electro-magnetic solenoid valves 552*b* of the locking mechanism unit 55 to switch the operating position of each electromag-netic solenoid valve 552*b*, thereby bringing the locking mechanism unit 55 into the unlocking state. Thus, the operation signal of the unlock button 53*e* functions as an unlock command signal. Further, each electromagnetic sole-noid valve 552*b* functions as an interlocking mechanism unit that drives the associated locking pin 553 (locking member) along with operation of the unlock button 53 so as to switch the locking mechanism unit 55 from the locking state (restriction state) to the unlocking state (restriction-release state).

The stocker controller 54 executes control of transmission of information in parallel with execution of control of operation of the locking mechanism unit 55. In this trans-mission control, upon receiving the filling completion sig-nal, the stocker controller 54 outputs, as filling completion information, the fact of completion as well as information for identifying the workpiece setting board 52 for which filling of workpieces W is completed (information indicating on which layer in the workpiece stocker 5 the workpiece setting board 52 is located). Upon receiving the collection completion signal, the stocker controller 54 outputs, as collection completion information, the fact of completion as well as information for identifying the workpiece setting board 52 for which collection of workpieces W is completed. The output destinations of the filling completion information and collection completion information depend on the type of the workpiece stocker 5 associated with the stocker control-ler 54. Specifically, the controllers 54 for the material stocker 5*s* and the finished product stocker 5*k* output the filling completion information and the collection completion information to the overall transport controller 60 (see FIG. 9) that is described later. On the other hand, the controllers 54 for the loading stocker 5*s* and the unloading stocker 5*k* output the filling completion information and the collection completion information to the machining cell controller 80 that is described later.

[Configuration of Automated Guided Vehicle]

Figure 7:
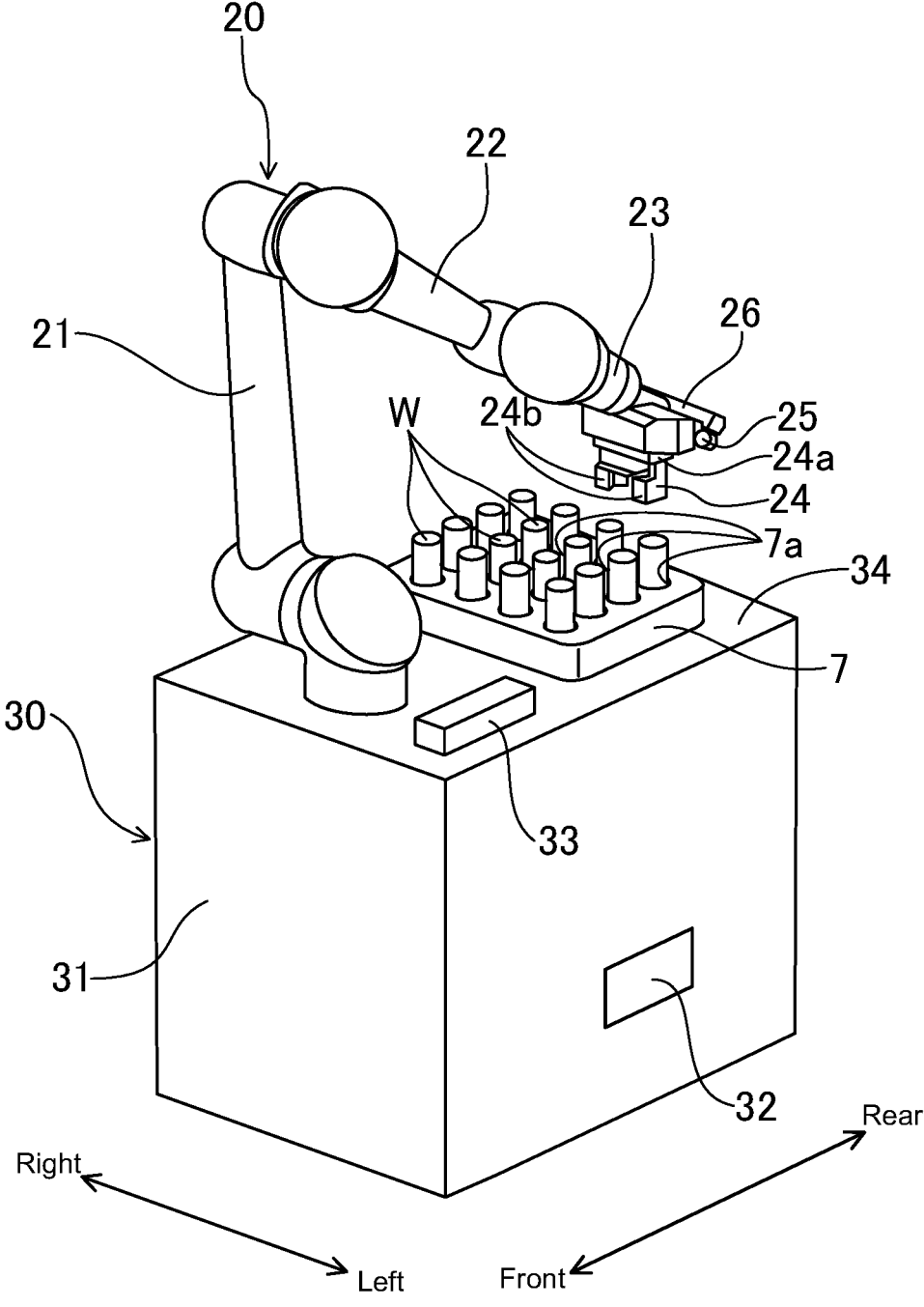
FIG. 7 is a perspective view illustrating an automated guided vehicle (AGV) and an AGV robot mounted on the automated guided vehicle used in the automated transport system according to the embodiment.

Next, the configuration of the automated guided vehicle 30 is described with reference to FIG. 7. The automated guided vehicle 30 has the AGV robot 20 mounted on the top of a rectangular parallelepiped housing 31 thereof and has an operation panel 33 attached thereto which can be carried around by the operator. The operation panel 33 has an operation unit for manually operating the automated guided vehicle 30 and the AGV robot 20 in a teaching operation and the like and has a display able to display pictures thereon. The housing 31 has left and right drive wheels (not shown) on the bottom thereof. The automated guided vehicle 30 is configured to travel straight by rotating the left and right drive wheels at the same rotational speed and to turn left and right by rotating the left and right drive wheels at different rotational speeds. The housing 31 has a distance sensor on the front face thereof. The distance sensor detects the distances to surrounding obstacles while the automated guided vehicle 30 is traveling. The housing 31 further has an alarm device (not shown) thereon that issues an alarm to the surroundings at the time of a failure or the like. The alarm device can be composed of a device issuing a sound alarm (e.g., an alarm speaker) or a device issuing a visual alarm (e.g., an alarm lamp).

The AGV robot 20 is mounted on a front end portion of the top of the automated guided vehicle 30. The AGV robot 20 is an articulated robot that has three arms, namely, a first arm 21, a second arm 22, and a third arm 23, and has a hand 24 as an end effector attached to the distal end of the third arm 23.

The hand 24 has a substantially rectangular parallelepiped body 24a and a pair of gripping jaws 24b. The pair of gripping jaws 24b protrude downward from the body 24a and face each other in a hand width direction. The hand 24 clamps and grips a workpiece W between the pair of gripping jaws 24b by bringing the gripping jaws 24b close to each other in the hand width direction. The hand 24 also has a pair of cameras 25 (only one of which is shown in FIG. 7) thereon. The cameras 25 are spaced apart from each other and attached via a support bar 26 to an upper portion of the hand 24. The pair of cameras 25 are provided, for example, in order to recognize the position, posture, and the like of the AGV robot 20 when causing the AGV robot 20 to grip a workpiece W.

Figure 8:
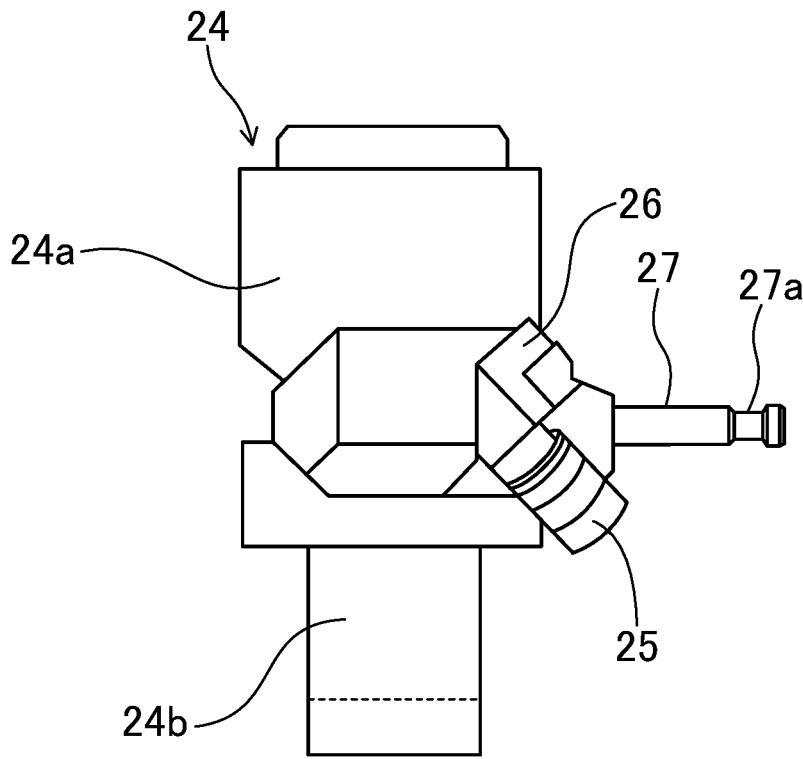
FIG. 8 is a side view of a hand of the AGV robot as viewed in a hand width direction.

FIG. 8 is a side view of the hand 24 as viewed in the hand width direction. The hand 24 has a cylindrical connecting rod 27 that protrudes from a side surface on the cameras 25 side of the body 24a and is able to be inserted into the cylindrical hole 52b (see FIG. 2) formed on the workpiece setting board 52. The connecting rod 27 is formed to extend horizontally forward (rightward in FIG. 8) of the hand 24 with the gripping jaws 24b of the hand 24 facing vertically downward. The connecting rod 27 has on a distal end portion thereof an engagement groove 27a that is slightly recessed inward in the radial direction and formed throughout the entire circumference of the connecting rod 27. When the workpiece setting board 52 of the workpiece stocker 5 is to be pulled out by the AGV robot 20, the connecting rod 27 is inserted into the cylindrical hole 52b formed on the workpiece setting board 52. The cylindrical hole 52b has an engagement protrusion (not illustrated) formed therein that engages with the engagement groove 27a of the connecting rod 27. The engagement protrusion engaging with the engagement groove 27a connects the connecting rod 27 to the workpiece setting board 52. After the connection of the connecting rod 27 to the workpiece setting board 52 is completed, the workpiece setting board 52 is pulled out from the housing frame 51 of the workpiece stocker 5 by the hand 24 being moved forward in the sliding direction of the workpiece setting board 52 (see FIG. 2). When the workpiece setting board 52 is pulled out to the fully open position, the shock absorber 58 (see FIGS. 3 and 4) provided on the workpiece setting board 52 comes into contact with the stopper plate 51c provided inside the housing frame 51. If the hand 24 is moved further forward of the workpiece setting board 52 after the shock absorber 58 comes into contact with the stopper plate 51c, the engagement groove 27a of the connecting rod 27 and the engagement protrusion in the cylindrical hole 52b are disengaged and the connecting rod 27 is pulled out of the cylindrical hole 52b of the workpiece setting board 52. Note that returning the pulled-out workpiece setting board 52 to the predetermined housed position does not need the use of the connecting rod 27 and the pulled-out workpiece setting board 52 can be returned to the housed position by pressing the hand 24 against a front end surface of the workpiece setting board 52 and moving the hand 24 to the side of the housed position.

The automated guided vehicle 30 has a loading surface portion 34 on the rear side of the AGV robot 20 on the top thereof, on which workpieces W are to be loaded. In this embodiment, a plurality of (16 in the example shown in the drawings) cylindrical workpieces W are loaded on the loading surface portion 34 in a state of being held by a pallet 7. The pallet 7 has a flat rectangular parallelepiped shape and has a plurality of upwardly open cylindrical holes 7a on the top thereof. The plurality of workpieces W are vertically erected with the base ends thereof respectively fitted in the cylindrical holes 7a of the pallet 7.

The AGV robot 20 is configured to be able to perform an operation of moving a workpiece W extracted from the workpiece setting board 52 onto the pallet 7 and an operation of moving a workpiece W extracted from the pallet 7 onto the workpiece setting board 52.

The automated guided vehicle 30 is configured to travel tracklessly in the building 2 under control by the AGV controller 70. In this embodiment, the automated guided vehicle 30 travels between the charging position P0 set for the power supply station 6 (see FIG. 1), the working positions P1 to P3 set for the three material stockers 5s, the working positions P4 to P6 set for the three finished product stockers 5k, and the working positions P7 to P10 set for the loading stockers 5t and unloading stockers 5h for the machining cells 100. The working positions P7 to P10 function as working positions for the AGV robot 20 to perform loading/unloading of a workpiece W into/from the machining cells 100. That is to say, the working positions P7 to P10 function as working positions for the loading stockers 5t and the unloading stockers 5h and as working positions for the machining cells 100.

[Configuration of Control System of Automated Transport System]

As illustrated in FIG. 9, the control system of the automated transport system 1 includes the overall transport controller 60 and the AGV controller 70. The overall transport controller 60 is configured to communicate with the machining cell controller that controls the production processes in the machining cells 100. In FIG. 9, each solid line arrow represents transmission and reception of signals (information) by wired communication and each broken line arrow represents transmission and reception of signals (information) by wireless communication. Note that each transmission and reception of signals is not limited to the manner shown in FIG. 9 and may be carried out by wired communication or by wireless communication.

The overall transport controller 60, the AGV controller 70, and the machining cell controller 80 are each composed of a computer including a CPU, a RAM, and a ROM. Their functional units are functionally implemented by a computer program and their storages are composed of an appropriate storage medium such as a RAM.

First, the machining cell controller 80 is described. The machining cell controller 80 is fixedly disposed in the factory building 2. The machining cell controller 80 has a cell robot control unit 81, a device control unit 82, an information storage 83, a stock status recognition unit 84, a command relay unit 85, and an input and output interface 86. The machining cell controller 80 is connected to the controller 10a for the machine tool 10, the controller 54 for the loading stocker 5t, and the controller 54 for the unloading stocker 5h in each machining cell 100 via the input and output interface 86 and is configured to wirelessly communicate with the overall transport controller 60 via the input and output interface 86. The controller 10a for the machine tool 10 and the stocker controllers 54 are each composed of a computer including a CPU, a RAM, and a ROM.

The cell robot control unit 81 causes the cell robot 11 to perform the cycle operation in accordance with a sequence program that is previously stored in the ROM.

The device control unit 82 activates the cleaning device 14 and the drying device 15 at predetermined timings while recognizing the status of workpiece setup in the cleaning device 14 and the drying device 15 by the cell robot 11 through communication with the cell robot control unit 81.

The information storage 83 stores operating poses into which the cell robot 11 is to be brought while performing the cycle operation, operating conditions for the cleaning device 14, the drying device 15, and other peripheral devices, as well as other information. The operating poses are set in a teaching operation performed to the cell robot 11 by the operator.

The stock status recognition unit 84 recognizes (calculates) the workpiece stock statuses in the loading stocker 5*t* and the unloading stocker 5*h* in each machining cell 100 based on the filling completion information and collection completion information received from the controllers 54 for the loading stocker 5*t* and the unloading stocker 5*h* in the machining cell 100 and the number of workpieces W added to or reduced from each workpiece setting board 52 by operation of the cell robot 11 up to the point of the recognition (calculation).

For example, when receiving the filling completion information indicating that the second workpiece setting board 52 from the top of the loading stocker 5*t* is filled with workpieces W, the stock status recognition unit 84 determines that there are now six workpieces W on the workpiece setting board 52. When thereafter recognizing based on the contents of operation performed by the cell robot 11 that two workpieces W have been extracted from the workpiece setting board 52 by the cell robot 11, the stock status recognition unit 84 recognizes that the number of workpieces W stored on the workpiece setting board 52 is four (=6−2). The stock status recognition unit 84 is also capable of recognizing the number of workpieces W as well as the arrangement of workpieces W on each workpiece setting board 52 by identifying from which ones of the stock holes 52*a* formed in three rows and two columns on the workpiece setting board 52 the workpieces W have been extracted by the cell robot 11. The stock holes 52*a* from which the workpieces W have been extracted by the cell robot 11 can be identified, for example, based on a predetermined extraction rule (for example, a rule in which the extraction is to be carried out in a left-to-right fashion and on row-by-row basis from the front row).

In this embodiment, when receiving the filling completion information from the controller 54 for the loading stocker 5*t* or the controller 54 for the unloading stocker the stock status recognition unit 84 determines that the workpiece setting board 52 identified based on the received filling completion information is fully filled with workpieces W. However, the present invention is not limited to this configuration. For example, a configuration is possible in which the operator can input through the operation panel 53 the number of workpieces W he/she has added to each workpiece setting board 52 and the number of workpieces W on the workpiece setting board 52 after the addition is determined based on the input number of workpieces W.

The command relay unit 85 receives the lock command signal, the unlock command signal, and the unlocking prohibit command signal from a locking control unit 66 of the overall transport controller 60 that is described later, and transmits each received signal to the corresponding one of the controllers 54 for the loading stockers 5*t* and unloading stockers 5*h* in the machining cells 100.

The overall transport controller 60 is fixedly disposed in the factory building 2. The overall transport controller 60 has a stock status recognition unit 61, a cell status obtainment unit 62, an information storage 63, a job generation unit 64, an operator notification unit 65, a locking control unit 66 as the pullout control unit, and an input and output interface 67. The overall transport controller 60 is connected to an operator terminal 8, the controllers 54 for the material stockers 5*s*, and the controllers 54 for the finished product stockers 5*k* via the input and output interface 67 and is configured to wirelessly communicate with the AGV controller 70 and the machining cell controller 80 via the input and output interface 67. For example, the operator terminal 8 is composed of a computer that is installed in a residence space for the operator, or composed of a portable terminal that is carried around by the operator.

The stock status recognition unit 61 recognizes (calculates) the workpiece stock status in each of the material stockers 5*s* and finished product stockers 5*k* based on the filling completion information and collection completion information received from the controllers 54 for the material stockers 5*s* and the finished product stockers 5*k* and the number of workpieces W added to or reduced from each workpiece setting board 52 by operation (storage or extraction) of the AGV robot 20 up to the point the point of the recognition (calculation). The workpiece stock status includes not only the number of workpieces W stored on the workpiece setting board 52 but also information on the arrangement of the workpieces W on the workpiece setting board 52. Here, detailed description of the procedure for the recognition of the workpiece stock status in each of the material stockers 5*s* and finished product stockers 5*k* is omitted since it is the same as that for recognition of the workpiece stock status in each of the loading stockers 5*t* and unloading stockers 5*h* by the stock status recognition unit 84 of the machining cell controller 80 described later.

The cell status obtainment unit 62 obtains information on the process progress status in each machining cell 100 (hereinafter, referred to as "process progress information") from the machining cell controller 80. For example, the process progress information obtained by the machining cell controller 80 consists of information indicating which one of the three steps (the machining step, the cleaning step, and the drying step) is being performed in each machining cell 100 and how much the currently performed step has progressed in each machining cell 100. The process progress information preferably includes information which can identify the end time of the last step (in this embodiment, the drying step) in each machining cell 100. Further, the process progress information preferably includes information which can identify the end time of the first step (in this embodiment, the machining step of machining a workpiece W in the machine tool 10) in each machining cell 100.

The information storage 63 stores a plurality of job options based on which a job to be carried out by the automated guided vehicle 30 and the AGV robot 20 is determined. For example, the plurality of job options include options for a job of transporting workpieces W from the material stockers 5*s* to the loading stockers 5*t* of the machining cells 100 and options for a job of transporting workpieces W from the unloading stockers 5*h* of the machining cells 100 to the finished product stockers 5*k*. Each job consists of transport commands for the automated guided vehicle 30 and operation commands for the AGV robot 20, which is described later.

The job generation unit 64 executes simulation of transport of workpieces W for the job options stored in the information storage 63 based on the workpiece stock status in each workpiece stocker 5 recognized by the stock status recognition unit 61, and generates (determines) a job to be carried out by the automated guided vehicle and the AGV robot 20, based on a job option minimizing the travel distance from the current position of the automated guided vehicle 30. An example of the job generated by the job generation unit 64 consists of: (i) moving the automated guided vehicle 30 to the working position P2 for the middle one of the three material stockers and stopping it there; (ii) causing the AGV robot 20 to pull out the second workpiece setting board 52 from the top of the material stocker 5s and then extract three workpieces W from the pulled-out workpiece setting board 52 and load the extracted three workpieces W onto the pallet 7 on the automated guided vehicle 30; (iii) thereafter, moving the automated guided vehicle 30 to the working position P7 for the loading stocker 5t for the machining cell 100 located on the sub-passage 4 side (the upper side in FIG. 1) and stopping it there; and (iv) causing the AGV robot 20 to pull out the second workpiece setting board 52 from the top of the loading stocker 5t and then set the three workpieces W loaded on the pallet 7 onto the pulled-out workpiece setting board 52. In this example job, the command (i) and the command (iii) correspond to the transport commands for the automated guided vehicle 30 and the command (ii) and the command (iv) correspond to the operation commands for the AGV robot 20.

The operator notification unit 65 determines based on the workpiece stock status recognized by the stock status recognition unit 61 whether any of the workpiece setting boards 52 in the material stockers 5s needs filling of workpieces W (for example, whether there is a workpiece setting board 52 that has 0 workpiece W thereon). When determining that any of the workpiece setting boards 52 needs filling of workpieces W, the operator notification unit 65 transmits identification information for the workpiece setting board 52 (for example, information that can identify both in which one of the three material stockers 5s shown in FIG. 1 the workpiece setting board 52 is present and on which layer in the material stocker 5s the workpiece setting board 52 is located) to the operator terminal 8.

The operator notification unit 65 further determines based on the workpiece stock status recognized by the stock status recognition unit 61 whether any of the workpiece setting boards 52 in the finished product stockers 5k needs collection of workpieces W (for example, whether there is a workpiece setting board 52 that has reached the maximum workpiece loading capacity). When determining that any of the workpiece setting boards 52 needs collection of workpieces W, the operator notification unit 65 transmits identification information for the workpiece setting board 52 to the operator terminal 8.

The locking control unit 66 identifies based on the job generated by the job generation unit 64 the workpiece stocker 5 as a target for pullout (operation) to be performed by the AGV robot 20, and transmits the operation command signals (the lock command signal, the unlock command signal, and the unlocking prohibit command signal) for the locking mechanism unit 55 through a predetermined transmission path according to the type of the identified workpiece stocker 5.

That is to say, where the workpiece stocker 5 as a target for operation to be performed by the AGV robot 20 is any of the material stockers 5s or any of the finished product stockers 5k, the locking control unit 66 transmits the operation command signals for the locking mechanism unit 55 directly to the controller 54 for the material stocker 5s or the finished product stocker 5k. On the other hand, where the workpiece stocker 5 as a target for operation to be performed by the AGV robot is any of the loading stockers 5t or any of the unloading stockers 5h, the locking control unit 66 transmits the operation command signals for the locking mechanism unit 55 to the controller 54 for the loading stocker 5t or the unloading stocker 5h via the command relay unit 85 of the machining cell controller 80.

The AGV controller 70 is housed in the housing 31 of the automated guided vehicle 30. The AGV controller 70 has a travel control unit 71, a robot control unit 72, a charging control unit 73, an operating pose storage 74, a moving position storage 75, and an input and output interface 76. The AGV controller 70 is connected to the automated guided vehicle 30, the AGV robot 20, and the cameras via the input and output interface 76 and is configured to wirelessly communicate with the overall transport controller 60.

The travel control unit 71 controls travel of the automated guided vehicle 30 from its current position to a target destination in accordance with the transport commands for the automated guided vehicle 30 (*job*) received from the overall transport controller 60. By way of example, the travel control unit 71 executes the travel control of the automated guided vehicle 30 based on the SLAM (Simultaneous Localization and Mapping) algorithm. In the SLAM algorithm, mapping of the interior of the building 2 based on distance data detected by the distance sensor attached to the front face of the automated guided vehicle 30 and localization on the map are performed simultaneously. Based on the generated map, the travel control unit 71 causes the automated guided vehicle 30 to autonomously travel to the target destination without collision with obstacles. Note that, for example, where two or more automated guided vehicles 30 are used, a configuration is possible in which a host server executes the above-described mapping and localization and the host server controls to guide the automated guided vehicles 30 to their respective target destinations such that the automated guided vehicles 30 do not collide with each other. The travel control of the automated guided vehicle 30 is not limited to the trackless manner like the SLAM algorithm and may employ a rail-guided manner that causes the automated guided vehicle 30 to travel to the target destination while detecting reflector rails on the floor of the building 2 with a sensor attached to the automated guided vehicle 30.

The robot control unit 72 controls operation of the AGV robot 20 in accordance with the operation commands for the AGV robot 20 (*job*) received from the overall transport controller 60. The travel control unit 71 and the robot control unit 72 function as the operation control unit that operates the automated guided vehicle 30 and the AGV robot 20 in accordance with the job generated by the job generation unit 64.

The charging control unit 73 determines whether the automated guided vehicle 30 has arrived at the charging position P0 set on the front side (the right side in FIG. 1) of the power supply station 6 and a power receiver 32 arranged on a side surface of the automated guided vehicle 30 has faced a power supplier 6a of the power supply station 6. Upon determining that the power receiver 32 has faced the power supplier 6a, the charging control unit 73 switches a power supply path between the power receiver 32 of the automated guided vehicle 30 and the battery (an example of the electricity storage) housed in the housing 31 from a blocked state to a conductive state. Thereby, power supply to (charging of) the battery 35 through the power receiver 32 from the power supplier 6a of the power supply station 6 is started. Note that the determination whether the power receiver 32 of the automated guided vehicle 30 has faced the power supplier 6a is made based on, for example, whether infrared communication is established between an infrared transmitter arranged in the vicinity of the power supplier 6a and an infrared receiver arranged in the vicinity of the power receiver 32 of the automated guided vehicle 30.

The operating pose storage 74 stores operating poses into which the AGV robot 20 is brought when operated in accordance with the operation commands transmitted from the overall transport controller 60 (for example, a pose for pulling out the workpiece setting board 52 forward and a pose for setting or extracting a workpiece W into or from the stock hole 52a of the workpiece setting board 52). The operating poses are set in a teaching operation performed to the AGV robot 20 through the operation panel 33 by the operator before automatic operation control is started.

The moving position storage 75 is a functional unit that stores moving positions as specific target positions to which the automated guided vehicle 30 moves. The moving positions include the above-described charging position P0 and working positions P1 to P10. The charging position P0 and the working positions P1 to P10 are set by an operation (teaching operation) in which the operator manually operates the automated guided vehicle 30 through the operation panel 33 to move the automated guided vehicle 30 to each target position and the position is converted into position information on the map and the position information is stored into the moving position storage 75.

[Contents of Automated Transport Control]

Figure 10:
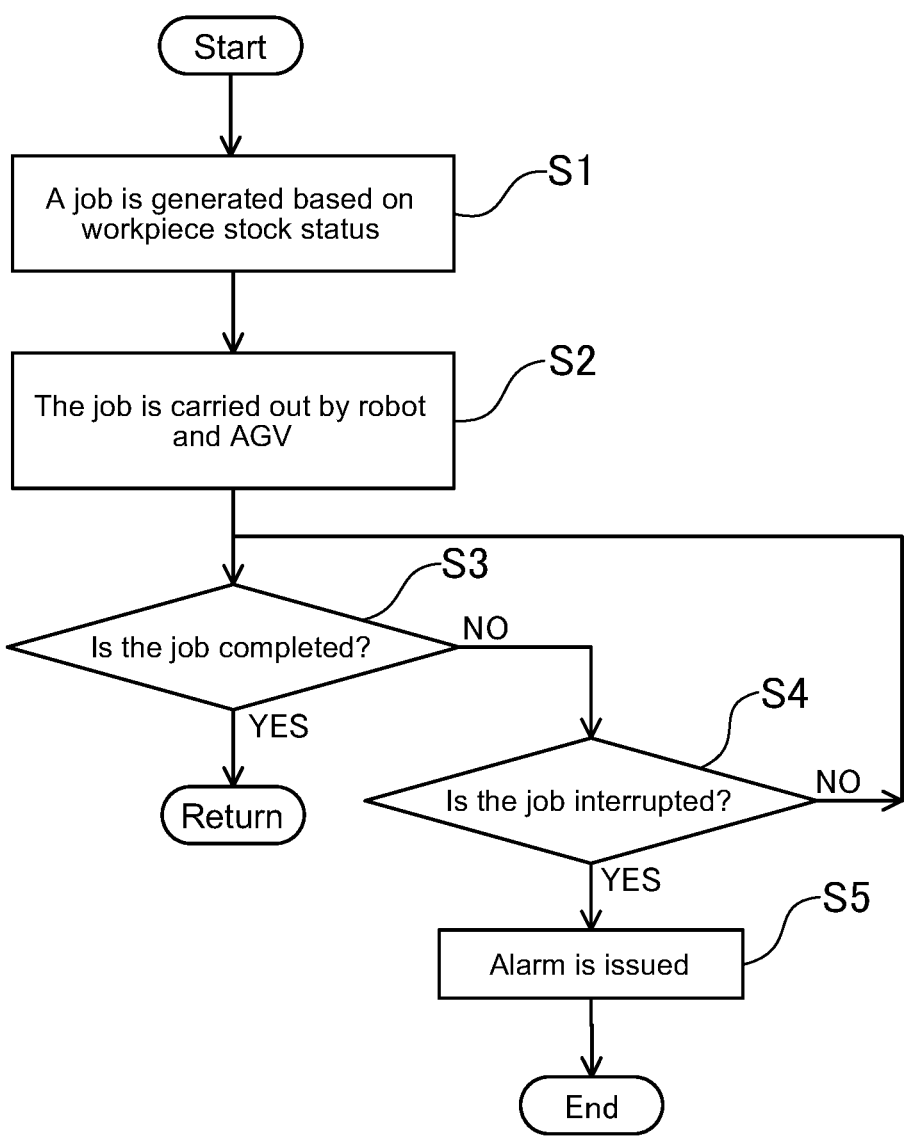
FIG. 10 is a flowchart showing the contents of automated transport control to be executed by the automated transport system according to the embodiment.

FIG. 10 is a flowchart showing the contents of automated transport control to be executed by the automated transport system 1 in this embodiment.

In this automated transport control, the job generation unit 64 first generates a job to be carried out by the automated guided vehicle 30 and the AGV robot 20 based on the workpiece stock status in each of the material stockers 5s and finished product stockers 5k recognized by the stock status recognition unit 61 and the workpiece stock statuses in the loading stocker 5t and the unloading stocker 5h in each machining cell 100 received from the stock status recognition unit 84 of the machining cell controller 80 (step S1). The job generated by the job generation unit 64 contains transport commands for the automated guided vehicle 30 (commands such as regarding the working position P1 to P10 as a start point and the working position P1 to 10 as an arrival point for the automated guided vehicle 30) and operation commands for the AGV robot 20. These commands are transmitted to the AGV controller 70. In the AGV controller 70, the travel control unit 71 causes the automated guided vehicle 30 to travel to the working positions P1 to P10 for the workpiece stockers 5 as the target destinations in accordance with the transport commands received from the overall transport controller 60, and the robot control unit 72 causes the AGV robot 20 to perform a predetermined operation in accordance with the operation commands received from the overall transport controller 60 (step S2).

The job generation unit 64 monitors the status of execution of the job (the transport commands and the operation commands) by the travel control unit 71 and the robot control unit 72 in the AGV controller 70, and determines whether the generated job is completed or not (step S3). When determining that the execution of the job by the travel control unit 71 and the robot control unit 72 is not completed, the job generation unit 64 determines whether the execution of the job is interrupted or not (step S4). When the job generation unit 64 determines that the execution of the job is interrupted (YES in step S4), the alarm device (not illustrated) issues the alarm to the surroundings (step S5). Thereafter, this automated transport control is stopped. On the other hand, when the job generation unit 64 determines that the execution of the job is not interrupted (NO in step S4), the determination in step S3 is repeated until the execution of the job is completed. After the execution of the job by the travel control unit 71 and the robot control unit 72 is completed, the process returns to step S1. Thereafter, the job generation unit 64 generates a new job to be carried out by the automated guided vehicle 30 and the AGV robot 20 based on the workpiece stock status in each workpiece stocker 5 newly recognized by the stock status recognition unit 61 and the workpiece stock status in each workpiece stocker 5 newly recognized by the stock status recognition unit 84.

[Contents of Automatic Drive Control of Locking Mechanism Unit (Pullout Restriction Mechanism Unit)]

Figure 11:
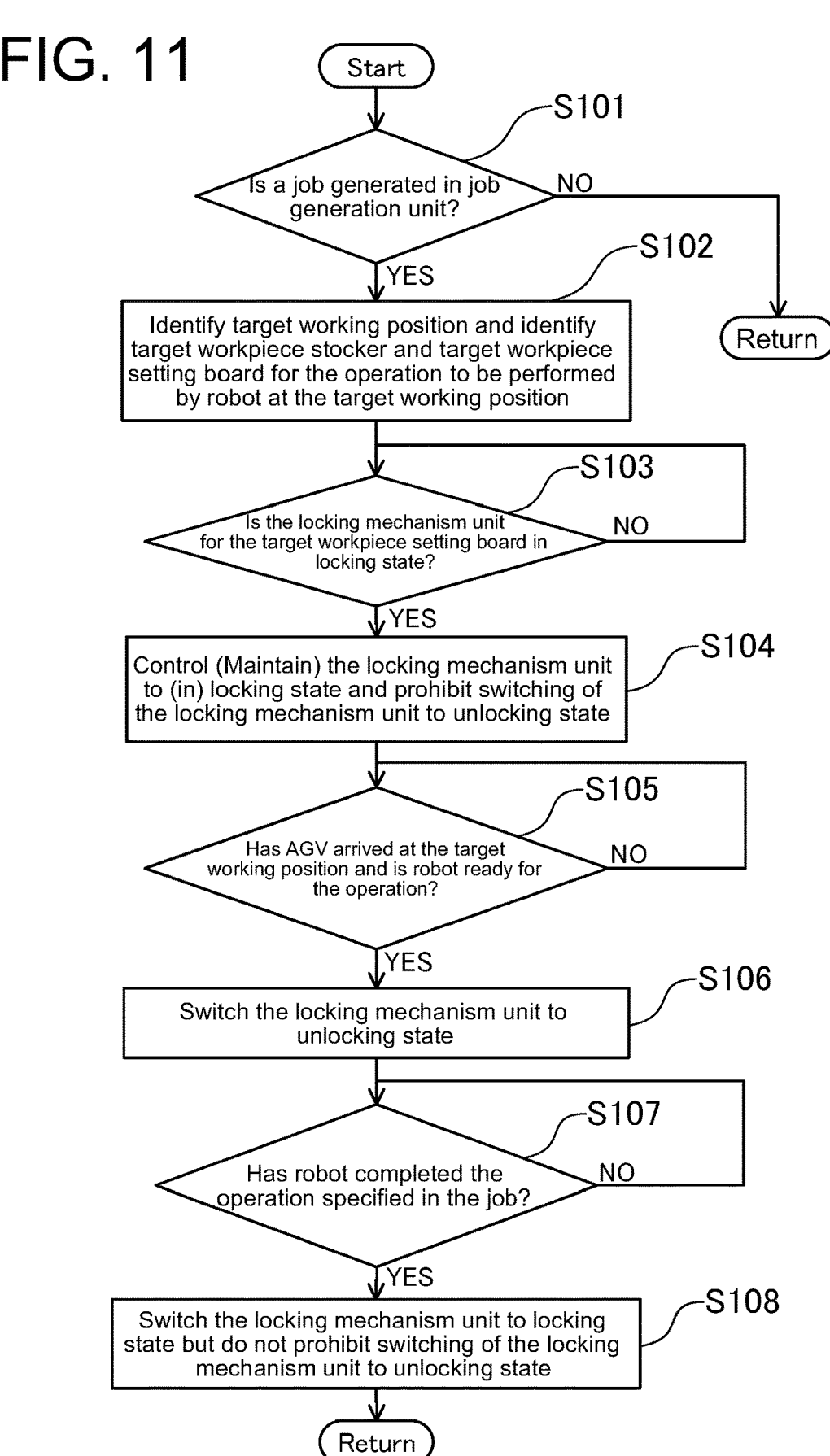
FIG. 11 is a flowchart showing the contents of automatic drive control of the locking mechanism unit provided for the workpiece stocker.

FIG. 11 is a flowchart showing the contents of the automatic drive control of the locking mechanism unit 55 to be executed in parallel with the automated transport control by the automated transport system 1 in this embodiment.

In this automatic drive control, the locking control unit 66 of the overall transport controller 60 first determines whether a job has been generated by the job generation unit 64 or not (step S101). When the locking control unit 66 determines that a job has not been generated, the process returns (NO in step S101). On the other hand, when the locking control unit 66 determines that a job has been generated by the job generation unit 64 (YES in step S101), the locking control unit 66 identifies the target working position P1 to P10, i.e., the target destination for the automated guided vehicle 30, specified in the job generated by the job generation unit 64 and identifies the target workpiece stocker 5 and workpiece setting board 52 for the operation to be performed by the AGV robot 20 at target working position P1 to P10 (step S102).

Subsequently, the locking control unit 66 determines whether the locking mechanism unit 55 for the workpiece setting board 52 identified in step S102 is in the locking state or not (step S103). When the locking control unit 66 determines that the locking mechanism unit 55 is not in the locking state (NO in step S103), the workpiece setting board 52 is deemed to be now pulled out and subjected to an operation performed by the operator. Accordingly, the determination is repeatedly executed until the locking mechanism unit 55 is switched to the locking state (i.e., until the filling completion button 53a or the collection completion button 53c is operated on the operation panel 53). Note that a workpiece setting board 52 with the associated locking mechanism unit 55 not in the locking state may be excluded in advance from the operation target for the AGV robot 20. Consequently, the determination in step S103 can be omitted so that the wasteful waiting time of the automated guided vehicle 30 is eliminated.

When the locking control unit 66 determines that the locking mechanism unit for the workpiece setting board 52 identified in step S102 is in the locking state (YES in step S103), the locking control unit 66 transmits to the stocker controller 54 the unlocking prohibit command signal for prohibiting switching of the locking mechanism unit 55 to the unlocking state (step S104). Thus, the locking control unit 66 transmits the unlocking prohibit command signal to the stocker controller 54 before the automated guided vehicle 30 starts movement toward the working position P1 to P10 specified in the job (i.e., immediately after the identification of the workpiece setting board 52 in step S102 is completed).

Subsequently, the locking control unit 66 determines whether the automated guided vehicle 30 has arrived at the working position P1 to P10 and the AGV robot is ready for the operation or not (step S105). This determination is made, for example, based on information regarding the position of the automated guided vehicle 30 and a signal regarding the state of the AGV robot 20 that are received from the AGV controller 70.

When the locking control unit 66 determines that the AGV robot 20 is not ready for the operation (NO in step S105), the locking control unit 66 continues to transmit the unlocking prohibit command signal to the stocker controller 54. Thus, until the AGV robot 20 becomes ready for the operation after the automated guided vehicle 30 arrives at the working position P1 to P10, the unlock button 53e of the operation panel 53 is disabled so that the unlocking of the locking mechanism unit 55 by manual operation is prohibited.

On the other hand, when the locking control unit 66 determines that the AGV robot 20 is ready for the operation (YES in step S105), the locking control unit 66 transmits the unlock command signal to the stocker controller 54 in order to switch the locking mechanism unit 55 for the workpiece setting board 52 identified in step S102 to the unlocking state (step S106).

After the locking mechanism unit 55 is switched to the unlocking state, the locking control unit 66 determines whether the AGV robot 20 has completed the operation (workpiece extraction operation or workpiece set operation) on the workpiece setting board 52 specified in the job (step S107). When determining that the AGV robot 20 has not completed the operation (NO in step S107), the locking control unit 66 executes the determination again. When determining that the AGV robot 20 has completed the operation (YES in step S107), the locking control unit 66 transmits the lock command signal to the stocker controller 54 in order to switch the locking mechanism unit 55 for the workpiece setting board 52 identified in step S102 to the locking state (step S108). In this process, the locking control unit 66 transmits the lock command signal but does not transmit the unlocking prohibit command signal. Therefore, even after the locking mechanism unit 55 for the workpiece setting board 52 is switched to the locking state by the stocker controller 54, the operator can switch the locking mechanism unit 55 to the unlocking state by operating the operation panel 53 as necessary. After the locking control unit 66 has completed the step S108, the process returns.

Note that the operation command signals output from the locking control unit 66 in steps S104, S106, and S108 are transmitted to the controller 54 for the workpiece stocker 5s, 5k, 5t and 5h according to the type of the target workpiece stocker 5 for the operation to be performed by the AGV robot 20 as described above.

Functions and Effects

In the automated transport system 1 in this embodiment, as described above, the locking control unit 66 of the overall transport controller 60 is configured to, when recognizing based on the job generated by the job generation unit 64 that the automated guided vehicle 30 is to be moved to the working position P1 to P6 for the material stocker 5s or finished product stocker 5k, execute the prohibition control operation (step S104) of identifying the workpiece stocker 5 and workpiece setting board 52 specified in the job as the target for the operation to be performed by the AGV robot 20, controlling the locking mechanism unit 55 for the workpiece setting board 52 to the locking state, and prohibiting switching of the locking mechanism unit from the locking state to the unlocking state to prevent the workpiece setting board 52 to be pulled out to the opposite vehicle working position side (the upper side in FIG. 1) before the automated guided vehicle 30 arrives at the working position P1 to P6 and the AGV robot 20 pulls out the workpiece setting board 52 to the vehicle working position side (the upper side in FIG. 1) after the identification.

Further, the locking control unit 66 of the overall transport controller 60 is configured to when recognizing based on the job generated by the job generation unit 64 that the automated guided vehicle 30 is to be moved to the loading stocker 5t or the unloading stocker 5h, executes the prohibition control operation (step S104) of identifying the workpiece stocker 5 and workpiece setting board 52 specified in the job as the target for the operation to be performed by the AGV robot 20, controlling the locking mechanism unit 55 for the workpiece setting board 52 to the locking state and prohibiting switching of the locking mechanism unit 55 from the locking state to the unlocking state to prevent the workpiece setting board 52 from being pulled out to the vehicle working position side (the right side in FIG. 1) before the automated guided vehicle 30 arrives at the working position P7 to P10 and the AGV robot 20 pulls out the workpiece setting board 52 to the vehicle working position side (the right side in FIG. 1) after the identification.

In this configuration, after a job is generated by the job generation unit 64, the locking control unit 66 control the locking mechanism unit 55 to the locking state and prohibits switching of the locking mechanism unit 55 to the unlocking state until the automated guided vehicle 30 arrives at the working position P1 to P10 and the AGV robot 20 pulls out the workpiece setting board 52 in accordance with the job. This prevents the workpiece setting board 52 from being pulled out by the operator unexpectedly before the AGV robot 20 starts the operation at the working position P1 to P10 as the target destination for the automated guided vehicle 30; consequently, the workpiece set operation or workpiece extraction operation to be performed by the AGV robot 20 in accordance with the job is prevented from being hindered by the operator carrying away a workpiece W supposed to be present on the workpiece setting board 52 or unnecessarily setting a workpiece W onto the workpiece setting board 52.

Further, the workpiece setting boards 52 of the workpiece stocker 5 in this embodiment are able to be pulled out, for example, from the predetermined housed position to both sides in the stocker depth direction. Therefore, differently from a workpiece stocker composed of a simple placement table, access paths to the workpiece stocker 5 do not concentrate on the top of the workpiece stocker 5, which improves the working efficiency.

Further, when the workpiece setting board 52 restricted in movement by the execution of the prohibit control operation is to be pulled out, the locking control unit 66 determines whether the automated guided vehicle 30 has arrived at the working position P1 to P10 and the AGV robot 20 is ready for the operation (step S105). In other words, through this determination process, the locking control unit 66 determines whether the working entity for the pullout is the AGV robot 20 on the automated guided vehicle 30 stopped at the working position P1 to P10 or not. When determining that the working entity is the AGV robot 20 (YES in step S105), the locking control unit 66 switches the locking mechanism unit 55 from the locking state to the unlocking state (step S106). On the other hand, when determining that the working entity is not the AGV robot 20, the locking control unit 66 continues to prohibit switching of the locking mechanism unit 55 from the locking state to the unlocking state.

With this configuration, pullout of the workpiece setting board 52 by a working entity other than the AGV robot 20 is reliably prohibited. Therefore, the workpiece setting board 52 is reliably prevented from being pulled out by the operator unexpectedly before the automated guided vehicle 30 arrives at the working position P1 to P10.

The prohibition control operation executed by the locking control unit 66 controls the locking mechanism unit 55 to the locking state and disables operation of the unlock button 53*e* on the operation panel 53.

With this configuration, since the unlock button 53*e* that is the only means for the operator to switch the locking mechanism unit 55 from the locking state to the unlocking state is disabled, switching of the locking mechanism unit 55 to the unlocking state is reliably prohibited.

The material stocker 5*s* and the finished product stocker 5*k* are configured such that the workpiece setting boards 52 thereof are able to be pulled out from the predetermined housed position to the opposite vehicle working position side (the upper side in FIG. 1) by the operator.

With this configuration, the operator can pull out the workpiece setting board 52 and performs material workpiece setting and finished workpiece collection without entering the working area of the automated guided vehicle 30 and AGV robot 20 (i.e., the area located on the sub-passage 4 side of the material stockers 5*s* and the finished product stockers 5*k* in FIG. 1). This maximally improves the working efficiency and the safety. Thus, the automated transport system 1 according to the present invention is useful for the configuration in which the operator and the AGV robot 20 perform work to the workpiece stocker 5 from opposite sides.

The loading stocker 5*t* and the unloading stocker 5*h* are configured such that the workpiece setting boards 52 thereof are able to be pulled out from the predetermined housed position to the vehicle working position side (the right side in FIG. 1) not only by the AGV robot 20 but also by the operator.

With this configuration, the operator and the AGV robot 20 can pull out the workpiece setting board 52 and perform work to the workpiece setting board 52 from the same side of the workpiece stocker 5. Therefore, for example, when a failure or the like occurs in the automated guided vehicle or the robot, the operator in place of the robot can perform the workpiece set operation or the like on the workpiece setting board 52. Thus, the automated transport system 1 according to the present invention is useful also for the configuration in which the operator and the AGV robot perform work to the workpiece stocker 5 from the same side of the workpiece stocker 5.

The workpiece stocker 5 has four (an example of the plurality) workpiece setting boards 52 and the locking mechanism unit 55 is provided for each of the four workpiece setting boards 52.

With this configuration, since the locking mechanism unit 55 is provided for each of the workpiece setting boards 52, it is possible to cause only the locking mechanism unit 55 for the workpiece setting board 52 as the target for the operation to be performed by the AGV robot 20 to prohibit pullout of the workpiece setting board 52. Therefore, it is possible to prevent unnecessary prohibition of pullout of the workpiece setting boards 52 not as the target for the operation to be performed by the AGV robot 20.

Other Embodiments

In the above-described embodiment, the locking state of the locking mechanism unit 55 is defined as a state where all of the four locking pins 553 are at the locking position. However, the present invention is not limited thereto.

Specifically, as for the locking state of the locking mechanism units 55 for the material stocker 5*s* and the finished product stocker 5*k*, for example, a configuration is possible in which only the two locking pins 553 located on the second side in the stocker depth direction (the lower side in FIG. 1, i.e., the vehicle working position side) (see FIG. 4) are positioned at the locking position and the two locking pins 553 located on the first side in the stocker depth direction are positioned at the unlocking position. In this configuration, movement of the workpiece setting member 52 to the first side (the opposite vehicle working position side) is prohibited by the two locking pins 553 located on the second side). Therefore, this configuration provides the same function and effect as in the above-described embodiment. Note that the locking mechanism units 55 may have any configuration which prohibits movement of the workpiece setting member 52 to at least the first side (the opposite vehicle working position side). For example, the locking mechanism units 55 may have a configuration in which the two locking pins 553 located on the first side are eliminated and only the two locking pins 553 located on the second side are provided.

As for the locking state of the locking mechanism units 55 for the loading stocker 5*t* and the unloading stocker 5*h*, for example, only the two locking pins 553 located on the second side in the stocker depth direction (the left side in FIG. 1, i.e., the opposite vehicle working position side) (see FIG. 4) are positioned at the locking position and the two locking pins 553 located on the first side are positioned at the unlocking position. In this configuration, movement of the workpiece setting member 52 to the first side (the vehicle working position side) is prevented by the two locking pins 553 located on the second side. Therefore, this configuration provides the same function and effect as in the above-described embodiment. Note that the locking mechanism units 55 may have any configuration which prohibits movement of the workpiece setting member 52 to at least the first side (the vehicle working position side). For example, the locking mechanism units 55 may have a configuration in which the two locking pins 553 located on the first side are eliminated and only the two locking pins 553 located on the second side are provided.

In the above-described embodiment, the working entity on the opposite vehicle working position side for the material stocker 5*s* and the finished product stocker 5*k* are only the operator. However, the present invention is not limited thereto and another configuration is also possible in which a working position for another automated guided vehicle (AGV) is set on the opposite vehicle working position side so that an AGV robot mounted on the other automated guided vehicle also can perform the workpiece set operation and the workpiece extraction operation on the workpiece setting members 52.

Further, the working entity on the opposite vehicle working position side for the loading stocker 5*t* and the unloading stocker 5h is the cell robot. However, another configuration is also possible in which a working position for another automated guided vehicle (AGV) is set on the opposite vehicle working position side so that an AGV robot mounted on the other automated guided vehicle also can perform the workpiece set operation and the workpiece extraction operation on the workpiece setting members 52.

In the above-described embodiment, the workpiece setting boards 52 are each configured to be able to be pulled out to both sides along the linear pullout path that extends horizontally in the stocker depth direction of the workpiece stocker 5. The present invention is not limited to such a pullout path. For example, the pullout path may have an L-shape intersecting at a right angle in plan view or may linearly extend in the vertical direction.

In the above-described embodiment, when the operation completion button (the filling completion button 53a or the collection completion button 53c) on the operation panel 53 is pressed by the operator, the locking mechanism unit 55 for the workpiece setting board 52 specified in the input but 53b, 53d is switched to the locking state to restrict movement of the workpiece setting board 52 to both sides. However, the present invention is not limited thereto and another configuration is also possible in which when the operation completion button is pressed, the locking mechanism units 55 for the workpiece stocker 5 are maintained in the unlocking state, and thereafter when the workpiece setting board 52 as the target for the operation to be performed by the AGV robot 20 is identified based on the job generated by the job generation unit 64, the prohibition control operation (step S104) is executed so that the locking mechanism unit 55 for the identified workpiece setting board 52 is switched to the locking state. In this configuration, the locking mechanism units 55 for the workpiece setting boards 52 are maintained in the unlocking state unless the associated workpiece setting board 52 becomes the target for the operation to be performed by the AGV robot 20. Therefore, the operator does not need to operate the unlock button 53e before pulling out the workpiece setting board 52; therefore, the operator can easily perform work. Note that, where this configuration is employed, the unlock button 53e may be eliminated. Eliminating the unlock button 53e simplifies the display configuration of the operation panel 53.

The above-described embodiment is with an example in which the pullout restriction mechanism unit that restricts movement of the workpiece setting board 52 employs the locking mechanism unit 55 using the locking pins 553. However, the present invention is not limited thereto. For example, the pullout restriction mechanism unit may be composed of a plurality of opening and closing shutters that cover the outer sides of the direction of pulling out the workpiece setting board 52. In this case, the prohibition control operation is carried out by the locking control unit 66 bringing the opening and closing shutters for the workpiece setting board 52 as the target for the operation to be performed by the AGV robot 20 into the closed state and prohibiting switching of the shutters from the closed state to the open state.

In the above-described embodiment, the air cylinders 551 that drive the locking pins 553 are fixed to the workpiece setting board 52 and the locked protrusions 59 are fixed to the side beams 51 of the housing frame 51. However, a converse configuration is also possible in which the air cylinders 551 are fixed to the side beams 51 of the housing frame 51 and the locked protrusions 59 are fixed to the workpiece setting board 52.

In the above-described embodiment, the locking mechanism unit 55 is configured to, in the locking state, restrict pullout movement of the workpiece setting board 52 by bringing the locking pins 553 into contact with the restricting surfaces 59a of the locked protrusions 59. However, the present invention is not limited thereto. For example, the lock mechanism unit 55 may be configured to restrict pullout movement of the workpiece setting board 52 by bringing vertically arranged locking pina 53 into engagement with engagement holes formed in the workpiece setting board 52.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

P1 Working position (vehicle working position)
P2 Working position (vehicle working position)
P3 Working position (vehicle working position)
P4 Working position (vehicle working position)
P5 Working position (vehicle working position)
P6 Working position (vehicle working position)
P7 Working position (vehicle working position)
P8 Working position (vehicle working position)
P9 Working position (vehicle working position)
P10 Working position (vehicle working position)
W Workpiece
1 Automated transport system
5 Workpiece stocker
5h Unloading stocker
5k Finished product stocker
5s Material stocker
5t Loading stocker
20 Robot
30 Automated guided vehicle
52 Workpiece setting board (workpiece setting member)
53e Unlock button (unlocking operation unit)
55 Locking mechanism unit (pullout restriction mechanism unit)
64 Job generation unit
66 Locking control unit (pullout control unit)
71 Travel control unit (operation control unit)
72 Robot control unit (operation control unit)
552b Electromagnetic solenoid valve (interlocking mechanism unit)
553 Locking pin (locking member)

What is claimed is:

1. A workpiece stocker housing a workpiece setting member for setting a workpiece thereon, wherein the workpiece stocker houses the workpiece setting member such that the workpiece setting member is able to be pulled out from a predetermined housed position to a vehicle working position side and an opposite vehicle working position side as both sides along a predetermined pullout path, the workpiece setting member is configured to be pulled out to the vehicle working position side by a robot mounted on an automated guided vehicle, the workpiece stocker comprising:

a pullout restriction mechanism unit configured to be switchable between a restriction state in which the pullout restriction mechanism unit restricts movement of the workpiece setting member mechanically such that the workpiece setting member cannot be pulled out from the predetermined housed position to at least the opposite vehicle working position side and a restriction-release state in which the pullout restriction mechanism unit releases the restriction of movement of the workpiece setting member, wherein the pullout restriction mechanism unit includes a locking mechanism unit that restricts pullout movement of the associated workpiece setting member, wherein the locking mechanism unit includes an air cylinder, a cylinder drive unit that drives the air cylinder, and a locking pin that is driven by the air cylinder; and a stocker controller configured to control driving of the pullout restriction mechanism unit, wherein the stocker controller is configured to, in the case that the stocker controller determines that a job has been generated by a job generation unit that generates jobs to be executed by the automated guided vehicle and the robot and identifies the workpiece setting member that will perform the work specified in the job, control the pullout restriction mechanism unit for the workpiece setting member in the restriction state until the automated guided vehicle arrives at the vehicle working position and switch the pullout restriction mechanism unit to the restriction-release state when the automated guided vehicle arrives at the vehicle working position.

2. The workpiece stocker according to claim 1, wherein:

a plurality of workpiece setting members are provided; and the stocker controller is configured to, in the case that the stocker controller determines that a job has been generated by a job generation unit that generates jobs to be executed by the automated guided vehicle and the robot and identifies a workpiece setting member among the plurality of workpiece setting members that will perform the work specified in the job, control the pullout restriction mechanism unit for the workpiece setting member in the restriction state until the automated guided vehicle arrives at the vehicle working position and switch the pullout restriction mechanism unit to the restriction-release state when the automated guided vehicle arrives at the vehicle working position.

3. A workpiece stocker housing a workpiece setting member for setting a workpiece thereon, wherein the workpiece stocker houses the workpiece setting member such that the workpiece setting member is able to be pulled out from a predetermined housed position to a vehicle working position side and an opposite vehicle working position side as both sides along a predetermined pullout path, the workpiece setting member is configured to be pulled out to the vehicle working position side by a robot mounted on an automated guided vehicle, the workpiece stocker comprising:

a pullout restriction mechanism unit configured to be switchable between a restriction state in which the pullout restriction mechanism unit restricts movement of the workpiece setting member mechanically such that the workpiece setting member cannot be pulled out from the predetermined housed position to at least the opposite vehicle working position side and a restriction-release state in which the pullout restriction mechanism unit releases the restriction of movement of the workpiece setting member, wherein the pullout restriction mechanism unit includes a locking mechanism unit that restricts pullout movement of the associated workpiece setting member, wherein the locking mechanism unit includes an air cylinder, a cylinder drive unit that drives the air cylinder, and a locking pin that is driven by the air cylinder; and a stocker controller configured to control driving of the pullout restriction mechanism unit, wherein the stocker controller is configured to prohibit the release of the restriction state of the workpiece setting member that will perform the work specified in a job before the automated guided vehicle starts moving toward the vehicle working position specified in the job, and switch the pullout restriction mechanism unit to the restriction-release state when the automated guided vehicle arrives at the vehicle working position.

4. The workpiece stocker housing a workpiece setting member for setting a workpiece thereon, wherein the workpiece stocker houses the workpiece setting member such that the workpiece setting member is able to be pulled out from a predetermined housed position to a vehicle working position side and an opposite vehicle working position side as both sides along a predetermined pullout path, the workpiece setting member is configured to be pulled out to the vehicle working position side by a robot mounted on an automated guided vehicle, the workpiece stocker comprising:

a pullout restriction mechanism unit configured to be switchable between a restriction state in which the pullout restriction mechanism unit restricts movement of the workpiece setting member mechanically such that the workpiece setting member cannot be pulled out from the predetermined housed position to at least the opposite vehicle working position side and a restriction-release state in which the pullout restriction mechanism unit releases the restriction of movement of the workpiece setting member, wherein the pullout restriction mechanism unit includes a locking pin that moves between a locking position in which the pullout restriction mechanism unit is in the restriction state and an unlocking position in which the pullout restriction mechanism unit is in the restriction-release state, and a restricting surface that comes into contact with the locking pin when the locking pin is positioned at the locking position; and a stocker controller configured to control driving of the pullout restriction mechanism unit, wherein the stocker controller is configured to, in the case that the stocker controller determines that a job has been generated by a job generation unit that generates jobs to be executed by the automated guided vehicle and the robot and identifies the workpiece setting member that will perform the work specified in the job, control the pullout restriction mechanism unit for the workpiece setting member in the restriction state until the automated guided vehicle arrives at the vehicle working position and switch the pullout restriction mechanism unit to the restriction-release state when the automated guided vehicle arrives at the vehicle working position.

5. The workpiece stocker according to claim 4, wherein the stocker controller is configured to, in the case that the stocker controller determines that the job has been generated by the job generation unit that generates jobs to be executed by the automated guided vehicle and the robot and identifies the workpiece setting member that will perform the work specified in the job, maintains the locking pin and the restricting surface in contact with each other until the automated guided vehicle arrives at the vehicle working position and switch the state so that the locking pin and the restricting surface are separated when the automated guided vehicle arrives at the vehicle working position.

6. A workpiece stocker housing a workpiece setting member for setting a workpiece thereon, wherein the workpiece stocker houses the workpiece setting member such that the workpiece setting member is able to be pulled out from a predetermined housed position to a vehicle working position side and an opposite vehicle working position side as both sides along a predetermined pullout path, the workpiece setting member is configured to be pulled out to the vehicle working position side by a robot mounted on an automated guided vehicle, the workpiece stocker comprising:

a pullout restriction mechanism unit configured to be switchable between a restriction state in which the pullout restriction mechanism unit restricts movement of the workpiece setting member mechanically such that the workpiece setting member cannot be pulled out from the predetermined housed position to at least the opposite vehicle working position side and a restriction-release state in which the pullout restriction mechanism unit releases the restriction of movement of the workpiece setting member, wherein the pullout restriction mechanism unit includes a locking pin that moves between a locking position in which the pullout restriction mechanism unit is in the restriction state and an unlocking position in which the pullout restriction mechanism unit is in the restriction-release state, and a restricting surface that comes into contact with the locking pin when the locking pin is positioned at the locking position; and a stocker controller configured to control driving of the pullout restriction mechanism unit, wherein the stocker controller is configured to prohibit the release of the restriction state of the workpiece setting member that will perform the work specified in a job before the automated guided vehicle starts moving toward the vehicle working position specified in the job, and switch the pullout restriction mechanism unit to the restriction-release state when the automated guided vehicle arrives at the vehicle working position.

* * * * *